US012586558B2

(12) United States Patent
Bowen et al.

(10) Patent No.: US 12,586,558 B2
(45) Date of Patent: Mar. 24, 2026

(54) PHONONIC CIRCUIT COMPONENTS

(71) Applicant: THE UNIVERSITY OF QUEENSLAND, St Lucia (AU)

(72) Inventors: Warwick Paul Bowen, St Lucia (AU); Christopher Galmiche Baker, St Lucia (AU); Glen Ivor Harris, St Lucia (AU); Nicolas Pierre Mauranyapin, St Lucia (AU); Timothy Martin Fox Hirsch, St Lucia (AU); Erick Rafael Romero Sanchez, St Lucia (AU)

(73) Assignee: THE UNIVERSITY OF QUEENSLAND, Queensland (AU)

( * ) Notice: Subject to any disclaimer, the term of this patent is extended or adjusted under 35 U.S.C. 154(b) by 231 days.

(21) Appl. No.: 18/547,483

(22) PCT Filed: Feb. 24, 2022

(86) PCT No.: PCT/AU2022/050151
§ 371 (c)(1),
(2) Date: Aug. 22, 2023

(87) PCT Pub. No.: WO2022/178589
PCT Pub. Date: Sep. 1, 2022

(65) Prior Publication Data
US 2024/0321256 A1 Sep. 26, 2024

(30) Foreign Application Priority Data
Feb. 24, 2021 (AU) ................................ 2021900492

(51) Int. Cl.
*G10K 11/36* (2006.01)

(52) U.S. Cl.
CPC .................................... *G10K 11/36* (2013.01)

(58) Field of Classification Search
CPC ...................................................... G10K 11/36
See application file for complete search history.

(56) References Cited

U.S. PATENT DOCUMENTS

| | | | | |
|---|---|---|---|---|
| 9,696,492 | B1 * | 7/2017 | Cox | G02F 2/004 |
| 2009/0295505 | A1 * | 12/2009 | Mohammadi | H10N 30/40 333/191 |
| 2019/0270635 | A1 | 9/2019 | Painter et al. | |
| 2020/0220520 | A1 | 7/2020 | Stokes et al. | |

OTHER PUBLICATIONS

"Daiki Hatanaka, Phonon propagation dynamics in band-engineered onedimensional phononic crystal waveguides, 2015, new journal of physics" (Year: 2015).*

(Continued)

*Primary Examiner* — Abdallah Abulaban
(74) *Attorney, Agent, or Firm* — Nixon & Vanderhye, PC

(57) ABSTRACT

A phononic circuit component including a membrane coupled to a substrate, the membrane including a region having an array of holes and a channel provided in the substrate beneath the region so that the region is released from the substrate, thereby allowing the region to propagate transverse acoustic waves, wherein the holes are spaced by a distance that is substantially smaller than a wavelength of the acoustic waves.

15 Claims, 19 Drawing Sheets

(56) References Cited

OTHER PUBLICATIONS

D. Hatanaka, et al., "Phonon propagation dynamics in band-engineered one-dimensional phononic crystal waveguides", New Journal of Physics, vol. 17, No. 11, 2015, p. 113032.
D. Puerto, et al., "Experimental demonstration of waveguiding in honeycomb and square-lattice silicon photonic crystal membranes", Proceedings of SPIE, vol. 8425, No. 1, 2012, pp. 84250X-I to 84250X-8.
International Search Report for PCT/AU2022/050151 dated May 5, 2022, 4 pages.
Written Opinion of the ISA for PCT/AU2022/050151 dated May 5, 2022, 5 pages.
Baller, M. K., et al., "A cantilever array-based artificial nose", Ultramicroscopy, vol. 82, 2000, 9 pages.
Balram, Krishna C., et al., "Coherent coupling between radiofrequency, optical and acoustic waves in piezo-optomechanical circuits", Nature Photonics, vol. 10, May 2016, pp. 346-352.
Bekker, Christiaan, et al., "Free spectral range electrical tuning of a high quality on-chip microcavity", Optics Express, vol. 26, No. 26, Dec. 24, 2018, pp. 33649-33670.
Bienfait, A., et al., "Phonon-mediated quantum state transfer and remote qubit entanglement", Science, vol. 364, Apr. 26, 2019, pp. 368-371.
Biswas, Kanishka, et al., "High-performance bulk thermoelectrics with all-scale hierarchical architectures", Nature, vol. 489, Sep. 20, 2012, pp. 414-418.
Cha, Jinwoong, et al., "Electrical tuning of elastic wave propagation in nanomechanical lattices at MHz frequencies", Nature Nanotechnology, vol. 13, Nov. 2018, pp. 1016-1020.
Cha, Jinwoong, et al., "Experimental realization of on-chip topological nanoelectromechanical metamaterials", Nature, vol. 564, Dec. 13, 2018, pp. 229-233.
Clarke, J., et al., The SQUID Handbook, vol. II, Applications of SQUIDSs and SQUID Systems, WILEY-VCH Verlag GmbH & Co. KGaA, 2006.
De Wilde, Yannick, et al., "Thermal radiation scanning tunnelling microscopy", Nature, vol. 444, Dec. 7, 2006, pp. 740-743.
Ekinci, K. L., et al., "Ultimate limits to inertial mass sensing based upon nanoelectromechanical systems", Journal of Applied Physics, vol. 95, No. 5, Mar. 1, 2004, pp. 2682-2689.
Emelett, Stephen J., et al., "Analysis of dual-microring-resonator cross-connect switches and modulators", Optics Express, vol. 13, No. 20, Oct. 3, 2005, pp. 7840-7853.
Fedorov, S. A., et al., "Generalized dissipation dilution in strained mechanical resonators", Physical Review B, vol. 99, pp. 054107-1-054107-8.
Fu, Wei, et al., "Phononic integrated circuitry and spin-orbit interaction of phonons", Nature Communications, vol. 10, Article No. 2743, 2019, 7 pages.
Furano, G., et al., "Review of radiation hard electronics activities at European Space Agency", Journal of Instrumentation, vol. 8, C02007, 2013, 13 pages.
Gabrielli, Lucas H., et al., "Silicon nanostructure cloak operating at optical frequencies", Nature Photonics, vol. 3, Aug. 2009, pp. 461-463.
Harrow, Aram W., et al., "Quantum computational supremacy", Nature, vol. 549, Sep. 14, 2017, pp. 203-209.
Hatanaka, D., et al., "A phonon transistor in an electromechanical resonator array", Applied Physics Letters, vol. 102, 2013, pp. 213102-1-213102-3.
Hatanaka, D., et al., "Phonon waveguides for electromechanical circuits", Nature Nanotechnology, vol. 9, Jul. 2014, pp. 520-524.
Haus, Hermann A., et al., "Coupled-Mode Theory", Proceedings of the IEEE, vol. 79, No. 10, Oct. 1991, pp. 1505-1518.
Hensinger, W. K., "Dynamical tunnelling of ultracold atoms", Nature, vol. 412, Jul. 5, 2001, pp. 52-55.
Jensen, K., et al., "An atomic-resolution nanomechanical mass sensor", Nature Nanotechnology, vol. 3, Sep. 2008, pp. 533-537.
Kaajakari, Ville, et al., "Nonlinear Limits for Single-Crystal Silicon Microresonators", Journal of Microelectromechanical Systems, vol. 13, No. 5, Oct. 2004, pp. 715-724.
Kaajakari, Ville, et al., "Nonlinear mechanical effects in silicon longitudinal mode beam resonators", Sensors and Actuators A, vol. 120, No. 1, 2004, pp. 64-70.
Kurosu, M., et al., "On-chip temporal focusing of elastic waves in a phononic crystal waveguide", Nature Communications, vol. 9, Article No. 1331, 2018, 7 pages.
Kurosu, M., et al., "Mechanical Kerr Nonlinearity of Wave Propagation in an On-Chip Nanoelectromechanical Waveguide", Physical Review Applied, vol. 13, 2020, pp. 014056-1-014056-9.
Lifshitz, Ron, et al., "Nonlinear Dynamics of Nanomechanical and Micromechanical Resonators", Review of Nonlinear Dynamics and Complexity, Chapter 1, 2008, 52 pages.
Longo, G., et al., "Rapid detection of bacterial resistance to antibiotics using AFM cantilevers as nanomechanical sensors", Nature Nanotechnology, vol. 8, Jul. 2013, pp. 522-526.
Luo, Lian-Wee, et al., "WDM-compatible mode-division multiplexing on a silicon chip", Nature Communications, vol. 5, Article No. 3069, 2014, 7 pages.
Mauranyapin, N. P., et al., "Evanescent single-molecule biosensing with quantum-limited precision", Nature Photonics, vol. 11, Aug. 2017, pp. 477-481.
Naesby, Andreas, et al., "Effects of pressure on suspended micromechanical membrane arrays", Applied Physics Letters, vol. 111, 2017, pp. 201103-1-201103-4.
Qiang, Zexuan, et al., "Optical add-drop filters based on photonic crystal ring resonators", Optics Express, vol. 15, No. 4, Feb. 19, 2007, pp. 1823-1831.
Rieger, Johannes, et al., "Energy losses of nanomechanical resonators induced by atomic force microscopy-controlled mechanical impedance mismatching", Nature Communications, vol. 5, Article No. 3345, 2014, 6 pages.
Romero, E., et al., "Propagation and Imaging of Mechanical Waves in a Highly Stressed Single-Mode Acoustic Waveguide", Physical Review Applied, vol. 11, 2019, pp. 064035-1-064035-7.
Romero, Erick, et al., "Engineering the Dissipation of Crystalline Micromechanical Resonators", Physical Review Applied, vol. 13, 2020, pp. 044007-1-044007-9.
Satzinger, K. J., et al., "Quantum control of surface acoustic-wave phonons", Nature, vol. 563, Nov. 29, 2018, pp. 661-665.
Savage, Kevin J., et al., "Revealing the quantum regime in tunnelling plasmonics", Nature, vol. 491, Nov. 22, 2012, pp. 574-577.
Schmid, Silvan, et al., Fundamentals of Nanomechanical Resonators, Springer International Publishing Switzerland, 2016.
Sfendla, Y. L., et al., "Extreme quantum nonlinearity in superfluid thin-film surface waves", Quantum Physics, arXiv:2005.13919v2, Nov. 10, 2020, 22 pages.
Shin, Heedeuk, et al., "Control of coherent information via on-chip photonic-phononic emitter-receivers", Nature Communications, vol. 6, Article No. 6427, 2015, 8 pages.
Taylor, Michael A., et al., "Cavity optoelectromechanical regenerative amplification", Optics Express, vol. 20, No. 12, Jun. 4, 2012, pp. 12742-12751.
Tian, Yonghui, et al., "Experimental demonstration of a reconfigurable electro-optic directed logic circuit using cascaded carrier-injection micro-ring resonators", Scientific Reports, vol. 7, 2017, 10 pages.
Tsaturyan, Y., et al., "Ultracoherent nanomechanical resonators via soft clamping and dissipation dilution", Nature Nanotechnology, vol. 12, Aug. 2017, pp. 776-783.
Wenzler, Josef-Stefan, et al., "A Nanomechanical Fredkin Gate", Nano Letters, vol. 14, 2014, pp. 89-93.
Yoshida, Shoji, et al., "Probing ultrafast spin dynamics with optical pump-probe scanning tunnelling microscopy", Nature Nanotechnology, vol. 9, Aug. 2014, pp. 588-593.
International Preliminary Report on Patentability dated Aug. 29, 2023, issued in International Application No. PCT/AU2022/050151, 6 pages.

* cited by examiner

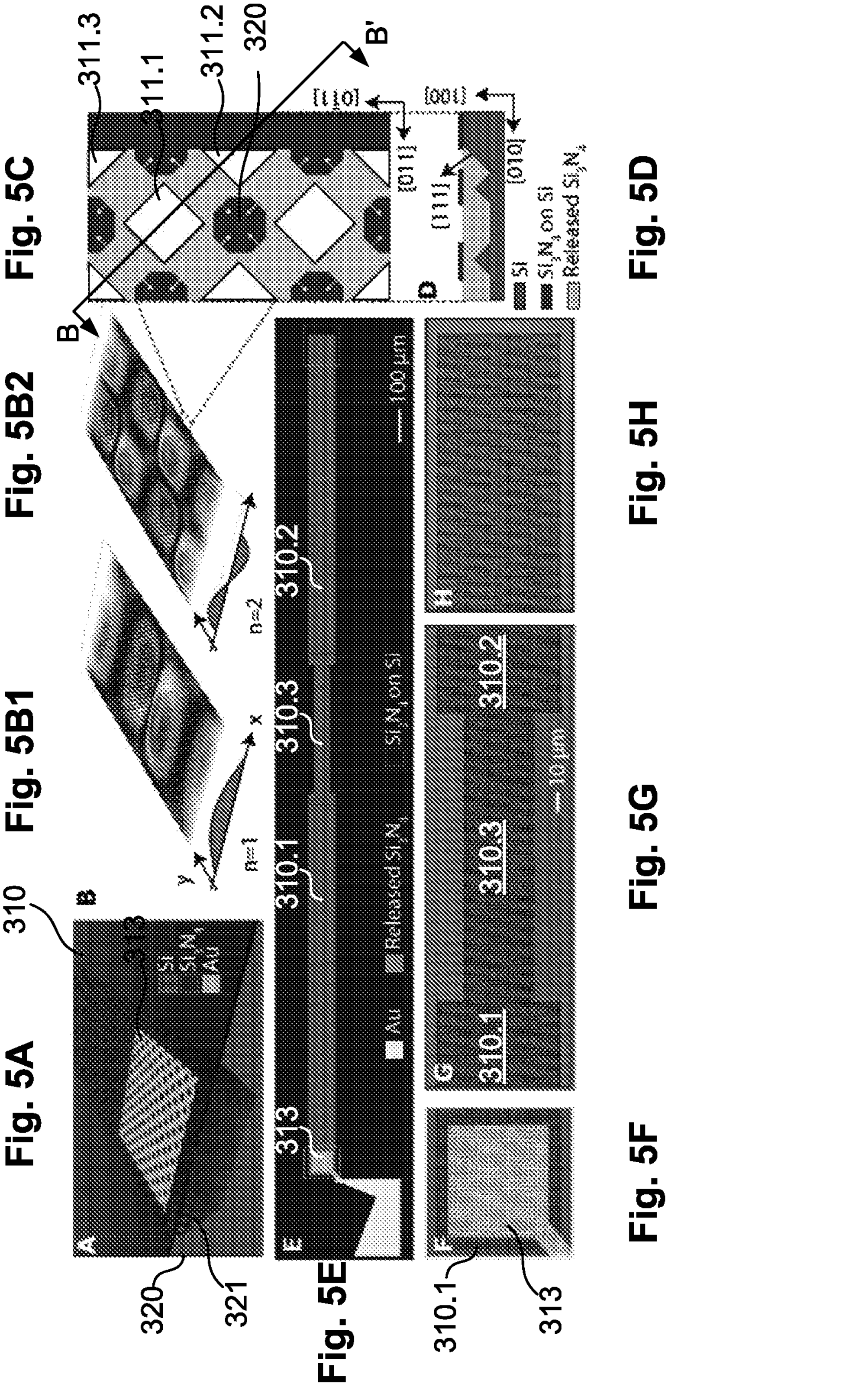
Fig. 5A Fig. 5B1 Fig. 5B2 Fig. 5C Fig. 5D Fig. 5E Fig. 5F Fig. 5G Fig. 5H Fig. 6C
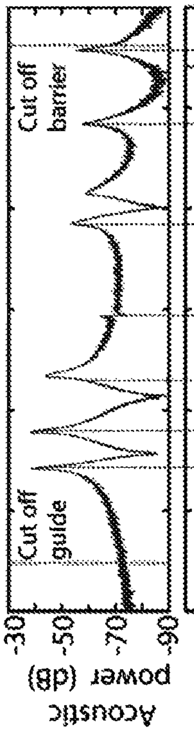
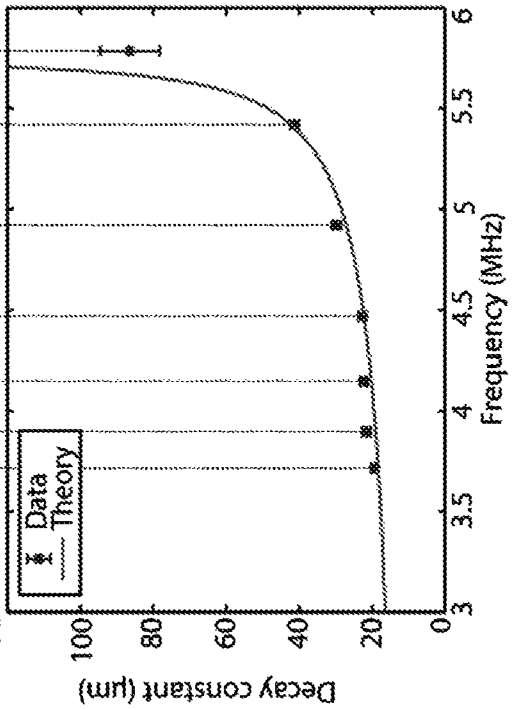
Fig. 6D
Fig. 6A
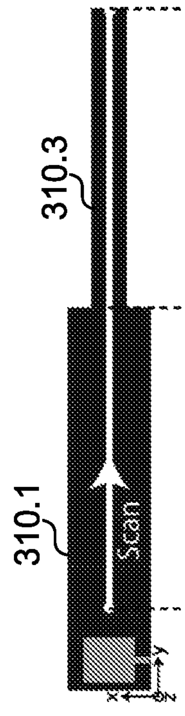
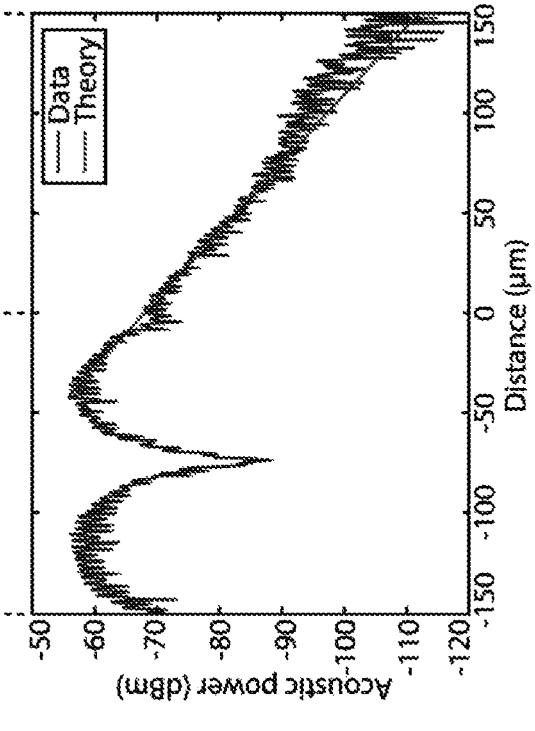
Fig. 6B

| Input A | Input B | XOR |
|---|---|---|
| 0 | 0 | 0 |
| 0 | 1 | 1 |
| 1 | 0 | 1 |
| 1 | 1 | 0 |
Fig. 12A
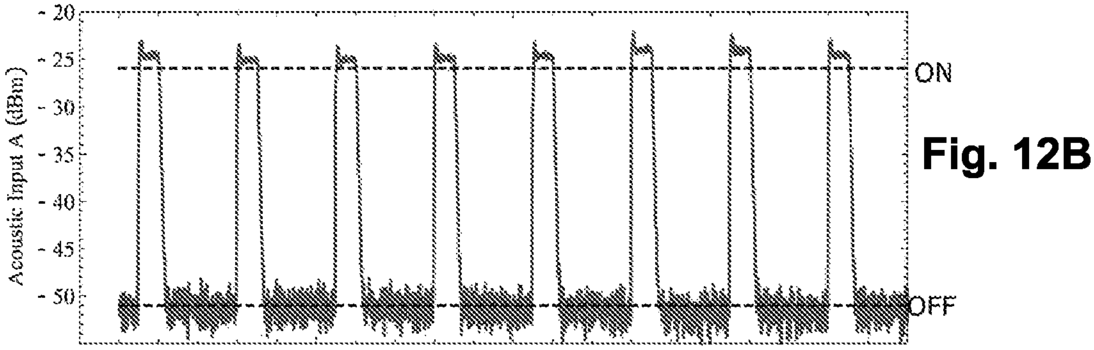
Fig. 12B
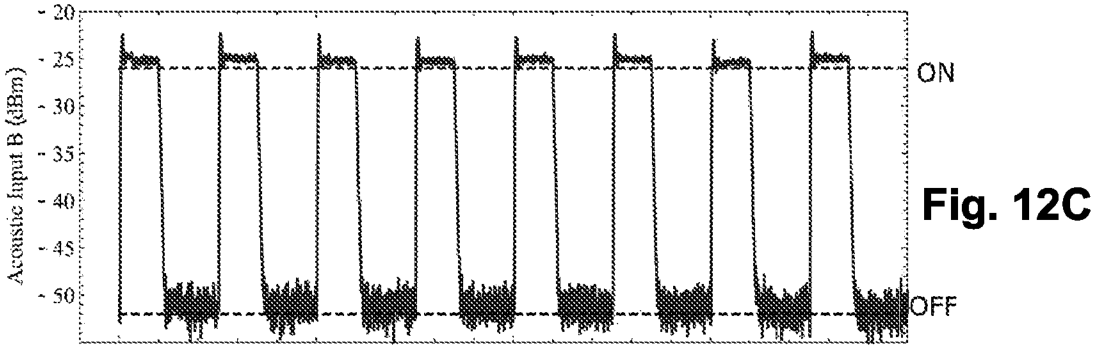
Fig. 12C
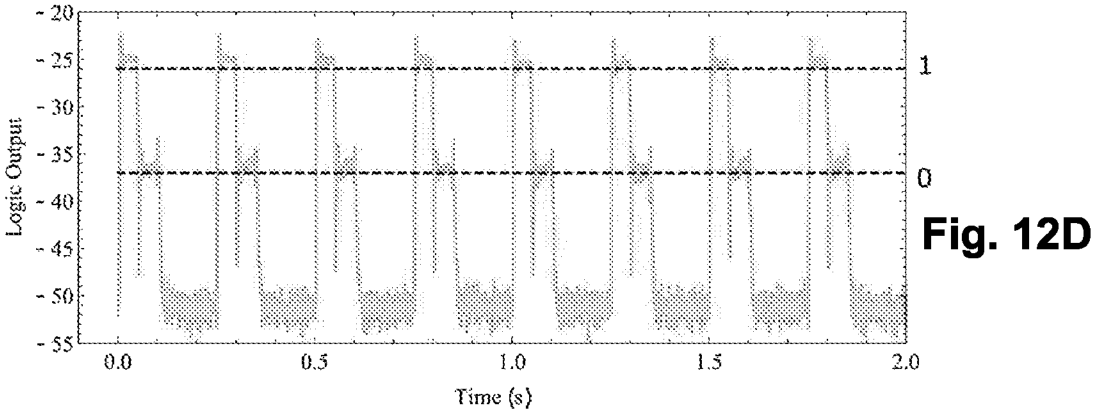
Fig. 12D

PHONONIC CIRCUIT COMPONENTS

CROSS-REFERENCE TO RELATED APPLICATIONS

This application is the U.S. national phase of International Application No. PCT/AU2022/050151 filed Feb. 24, 2022 which designated the U.S. and claims priority to AU 2021900492 filed Feb. 24, 2021, the entire contents of each of which are hereby incorporated by reference.

BACKGROUND OF THE INVENTION

The present invention relates to a phononic circuit component and method of manufacture thereof, as well as phononic circuits including multiple phononic circuit components.

DESCRIPTION OF THE PRIOR ART

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

Tunnelling is a fundamental process which allows particles to pass through a potential barrier that is higher than their energy. It is observed across many fields of physics, such as nuclear fusion and ultracold atom matter-waves, is critical to superconducting quantum sensors and computing, and has revolutionised the field of nano-scale imaging through transmission electron microscopy. Tunnelling is also commonly employed in optics, where it is generally referred to as evanescent coupling and the particles involved are photons. Its applications in that field range from fibre-optic components to electro-optic switches, optical tunnelling microscopes and plasmonic nanotechnologies.

Phonons are the quasi-particles associated with the propagation of acoustic waves such as sound and heat. Similarly to photonics, phonon tunnelling offers the promises of diverse applications, from heat mitigation in next-generation computer architectures, to integrated sensor arrays for biomedical diagnostics, nano-mechanical computers robust to ionising radiation, and quantum information processing and storage technologies.

Acoustic tunnelling has recently been exploited to build photonic filters, remotely prepare quantum entanglement, control quantum acoustic states, and build basic phononic circuits. However, the low compliance of the longitudinal and surface acoustic waves used in previous work has greatly restricted applications in areas such as nano-mechanical computing, nonlinear phononics and sensing. Transverse acoustic waves are favoured for these applications, due to their much higher compliance and therefore orders-of-magnitude reduced energy requirements.

Previous processes used to fabricate membrane-based phononic devices have relied either on deep-backside etching or used holes in the membrane to enable front-side etching that introduced wavelength-scale features.

For example, "*Propagation and Imaging of Mechanical Waves in a Highly Stressed Single-Mode Acoustic Waveguide*" by E. Romero, R. Kalra, N. P. Mauranyapin, C. G. Baker, C. Meng, and W. P. Bowen, Phys. Rev. Applied, 11:064035, (2019) and "*Engineering the Dissipation of Crystalline Micromechanical Resonators*" by Erick Romero, Victor M. Valenzuela, Atieh R. Kermany, Leo Sementilli, Francesca Iacopi and Warwick P. Bowen, Phys. Rev. Applied, 13:044007, (2020) describe a single-mode acoustic waveguide that enables robust propagation of mechanical waves using a highly stressed silicon-nitride membrane that supports the propagation of out-of-plane modes. However, the backside etching processes results in the need to etch through a several hundred micron thick substrate, which in turn limits both precision and feature size of the phononic components.

In the case of front side etching, "*On-chip temporal focusing of elastic waves in a phononic crystal waveguide*" by M. Kurosu, D. Hatanaka, K. Onomitsu & H. Yamaguchi in Nature Communications volume 9, Article number: 1331 (2018) describes temporal pulse manipulation in a dispersive one-dimensional phononic crystal waveguide, which enables the temporal control of ultrasonic wave propagation. The waveguide is a 1 mm long membrane made from a GaAs/AlGaAs heterostructure, where periodically spaced air boles with a pitch of 8 μm are formed along the membrane allowing the membrane to be suspended by selectively etching an underlaying $Al_{0.65}Ga_{0.35}As$ layer. Thus, this arrangement uses a linear arrangement of holes provided in a membrane, to allow a substrate under the membrane to be etched so that the membrane is supported and can propagate ultrasonic waves. An example of this is shown in FIG. 1, with the membrane 110 including holes 111.

However, this arrangement results in edges 112 of the waveguide having a scalloped arrangement, with a series of concave depressions 112.1 separated by sharp inwardly protruding ridges 112.2. These ridges and depressions impede propagation of acoustic waves along the membrane and in particular can lead to reflections of acoustic waves back against the direction of propagation, in turn leading to interference, resonances, and attenuation of the acoustic wave. Additionally, the holes 111 are of the order of the wavelength of the propagated ultrasonic waves, leading to further reflections and ultrasonic wave interference, in turn leading to additional acoustic wave attenuation. Furthermore, the arrangement limits the ability to fabricate arbitrary waveguides shapes. These issues make the arrangement unsuitable for many applications.

"*Experimental realization of on-chip topological nanoelectromechanical metamaterials*" by Jinwoong Cha, Kun Woo Kim & Chiara Daraio, Nature volume 564, pages 229-233 (2018) describes an experimental realization of topological nanoelectromechanical metamaterials, consisting of two-dimensional arrays of free-standing silicon nitride nanomembranes that operate at high frequencies (10-20 megahertz). The document describes experimentally demonstrating the presence of edge states, and characterizing their localization and Dirac-cone-like frequency dispersion. The topological waveguides are also robust to waveguide distortions and pseudospin-dependent transport. The on-chip integrated acoustic components realized here could be used in unidirectional waveguides and compact delay lines for high-frequency signal-processing applications.

However, in this example, the free-standing silicon nitride nanomembranes are in the form of hexagonal membranes, forming a honeycomb lattice, with individual membranes being suspended by supporting pillars of unetched thermal oxide, which act as fixed boundaries between the membranes. This in turn restricts the physical size of the membranes, thereby limiting the arrangement to propagation of high frequency acoustic waves, which are not suitable for all applications. Additionally, the presence of the pillars can lead to reflections and interference, thereby causing resonances in the acoustic response and acoustic wave attenuation.

SUMMARY OF THE PRESENT INVENTION

In one broad form, an aspect of the present invention seeks to provide a phononic circuit component including a membrane coupled to a substrate, the membrane including a region having an array of holes and a channel provided in the substrate beneath the region so that the region is released from the substrate, thereby allowing the region to propagate transverse acoustic waves, wherein the holes are spaced by a distance that is at least one of: substantially smaller than a wavelength of the acoustic waves; less than 10% of the wavelength of the acoustic waves; less than 5% of the wavelength of the acoustic waves; less than 2% of the wavelength of the acoustic waves; less than 1% of the wavelength of the acoustic waves; substantially smaller than a width of the region; less than 20% of the width of the region; less than 15% of the width of the region; less than 10% of the width of the region; less than 5% of the width of the region; and, less than 2% of the width of the region.

In one broad form, an aspect of the present invention seeks to provide a phononic circuit component including a membrane coupled to a substrate, the membrane including a region having an array of holes and a channel provided in the substrate beneath the region so that the region is released from the substrate, thereby allowing the region to propagate transverse acoustic waves, wherein the spaced holes define repeating units, and wherein each unit has a size that is at least one of: substantially smaller than a wavelength of the acoustic waves; less than 15% of the wavelength of the acoustic waves; less than 10% of the wavelength of the acoustic waves; less than 5% of the wavelength of the acoustic waves; less than 2% of the wavelength of the acoustic waves; substantially smaller than a width of the region; less than 30% of the width of the region; less than 25% of the width of the region; less than 20% of the width of the region; less than 15% of the width of the region; less than 10% of the width of the region; and, less than 5% of the width of the region.

In one embodiment the array is a two dimensional array and wherein the size of the repeating units includes a length and width of the repeating units.

In one embodiment the region extends substantially along a crystal axis of the substrate.

In one embodiment each hole has a size that is at least one of: substantially smaller than a wavelength of the acoustic waves; and, substantially smaller than a width of the region.

In one embodiment the array of holes includes at least one of: a grid of evenly spaced holes; and, a grid of evenly spaced holes including rows and columns arranged at 45° relative to one or more region edges.

In one embodiment the region is at least one of: a single mode acoustic waveguide: a multi-mode acoustic waveguide: a tunnel barrier: an acoustic waveguide including one or more pass bands: an acoustic waveguide including one or more stop bands; and, a resonator.

In one embodiment the component has a respective functionality depending at least in part on at least one of: a shape of the region; a width of the region: a length of the region; a configuration of the holes; a size of the holes; a shape of the holes; and, a hole spacing.

In one embodiment the waveguide includes different sized holes to modulate an acoustic impedance.

In one embodiment a width of the region is selected based on a desired cut off frequency for propagation of required acoustic wave modes based on the equation:

$$\Omega_{c,n} = \sqrt{\frac{\sigma}{\rho}\left(\frac{n\pi}{L_x}\right)}$$

where: $\Omega_{c,n}$ is a cut of frequency for mode n $\sigma$ is a membrane tensile stress $\rho$ is a membrane material density $L_x$ is the region width In one embodiment if the region includes a tunnel barrier, a ratio of reflection to tunnelling is based on a length of the region and an amplitude exponential decay length given by the equation:

$$\gamma = \left(\left(\frac{\pi}{L_x}\right) - \Omega^2\frac{\rho}{\sigma}\right)^{-1/2}$$

where: $\Omega$ is an acoustic wave frequency $\gamma$ is the amplitude exponential decay length $\sigma$ is a membrane tensile stress $\rho$ is a membrane material density $L_x$ is the region width In one embodiment the substrate is made of at least one of: a crystalline material; silicon; gallium arsenide; sapphire; and, lithium niobate.

In one embodiment the membrane is made of at least one of: silicon nitride; aluminium nitride; silicon carbide; and, silica.

In one broad form, an aspect of the present invention seeks to provide a phononic circuit including: a membrane coupled to a substrate; and a plurality of phononic circuit components according to an aspect of the present invention, wherein the regions of the phononic circuit components are connected to allow propagation of acoustic waves through the phononic circuit components.

In one embodiment the phononic circuit includes an actuator that generates acoustic waves in at least one of the one or more regions.

In one embodiment the actuator is at least one of: an electrostatic transducer or actuator; an interdigitated transducer or actuator; a piezoelectric transducer or actuator; and, a magnetostrictive transducer or actuator.

In one embodiment the actuator includes: a first electrode deposited on at least one region; a second electrode spaced from the first electrode; and, a signal generator configured to apply an electric signal between the first and second electrodes so as to electrostatically actuate acoustic waves in the at least one region.

In one embodiment the second electrode is at least one of: provided on an underside of the substrate; and, a ground plane electrode.

In one embodiment the phononic circuit includes a detector that detects acoustic waves in at least one of the one or more regions.

In one embodiment the detector is at least one of: an electrostatic detector; and, an optical detector.

In one embodiment the detector includes: a first electrode deposited on at least one region; a second electrode spaced from the first electrode; and, a sensor configured to sense a capacitance between the first and second electrodes, the capacitance depending on the presence of acoustic waves in the at least one region.

In one embodiment the phononic circuit is configured to act as at least one of: power splitters; spatial division multiplexers; filters; mode cleaners; transistors; adders; and, logic gates.

In one embodiment the phononic circuit includes: a single mode acoustic waveguide; and, at least one inverse dispersion waveguide segment acting as an inverse dispersion region to mitigate phononic dispersion in the single mode acoustic waveguide.

In one embodiment the single mode acoustic waveguide is coupled to the at least one inverse dispersion waveguide by at least one adiabatic waveguide segment.

In one broad form, an aspect of the present invention seeks to provide a method of manufacturing a phononic circuit, the method including providing a membrane coupled to a substrate, the membrane including one or more regions, each region having an array of holes and wherein the substrate includes a channel beneath each region so that each region is not coupled to the substrate, thereby allowing the one or more regions to propagate transverse acoustic waves, wherein the holes are spaced by a distance that is at least one of: substantially smaller than a wavelength of the acoustic waves; less than 10% of the wavelength of the acoustic waves; less than 5% of the wavelength of the acoustic waves; less than 2% of the wavelength of the acoustic waves; less than 1% of the wavelength of the acoustic waves; substantially smaller than a width of the region; less than 20% of the width of the region; less than 15% of the width of the region; less than 10% of the width of the region; less than 5% of the width of the region; and, less than 2% of the width of the region.

In one broad form, an aspect of the present invention seeks to provide a method of manufacturing a phononic circuit, the method including providing a membrane coupled to a substrate, the membrane including one or more regions, each region having an array of holes and wherein the substrate includes a channel beneath each region so that each region is not coupled to the substrate, thereby allowing the one or more regions to propagate transverse acoustic waves, wherein the spaced holes define repeating units, and wherein each unit has a size that is at least one of: substantially smaller than a wavelength of the acoustic waves; less than 15% of the wavelength of the acoustic waves; less than 10% of the wavelength of the acoustic waves; less than 5% of the wavelength of the acoustic waves; less than 2% of the wavelength of the acoustic waves; substantially smaller than a width of the region; less than 30% of the width of the region; less than 25% of the width of the region; less than 20% of the width of the region; less than 15% of the width of the region; less than 10% of the width of the region; and, less than 5% of the width of the region.

In one embodiment the method includes: creating an array of holes in the membrane to form each region; and, etching the substrate beneath the holes to create a channel beneath each region.

In one embodiment the method includes creating the array of holes using at least one of: electron beam lithography; UV photolithography; and, reactive ion etching.

In one embodiment the method includes etching the substrate using anisotropic wet etching.

In one embodiment the etching results in the channel having side walls with sub-wavelength sidewall roughness.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which: —

FIG. 5A is a schematic diagram of an example of a meshed phononic waveguide released from a silicon substrate and including a gold actuation electrode;

FIG. 5B1 is a schematic diagram of an example of a first transverse acoustic mode profile for the waveguide of FIG. 5A;

FIG. 5B2 is a schematic diagram of an example of a second transverse acoustic mode profile for the waveguide of FIG. 5A;

FIG. 5C is a schematic plan view of the membrane and substrate during etching;

FIG. 5D is a schematic cross sectional view along the line B-B' of FIG. 5C;

FIG. 5E is an optical microscope image of an example of a phononic circuit including an input waveguide, a tunnel barrier and an output waveguide;

FIGS. 5F to 5H are false color scanning electron micrograph images of an example of the actuation region of the input waveguide, the tunnel barrier and an end of the output waveguide of FIG. 5E, respectively;

FIG. 6A is a schematic plan view of an example of a phononic circuit including a waveguide and tunnel barrier;

FIG. 6B is a graph illustrating an example of acoustic wave power measured along the phononic circuit of FIG. 6A;

FIG. 6C is a graph illustrating an example of acoustic wave power against frequency for a middle of the waveguide of FIG. 6A;

FIG. 6D is a graph illustrating an example of a decay constant against frequency for a middle of the waveguide of FIG. 6A;

FIG. 12A is a table of an example of XOR gate inputs and outputs obtained by appropriate driving of the resonator in FIG. 11A;

FIG. 12B is a graph of illustrating measured first acoustic waves input to the XOR gate of FIG. 11A;

FIG. 12C is a graph of illustrating measured second acoustic waves input to the XOR gate of FIG. 11A;

FIG. 12D is a graph of illustrating measured acoustic waves output from the XOR gate of FIG. 11A;

DETAILED DESCRIPTION OF THE PREFERRED EMBODIMENTS

Figure 2A:
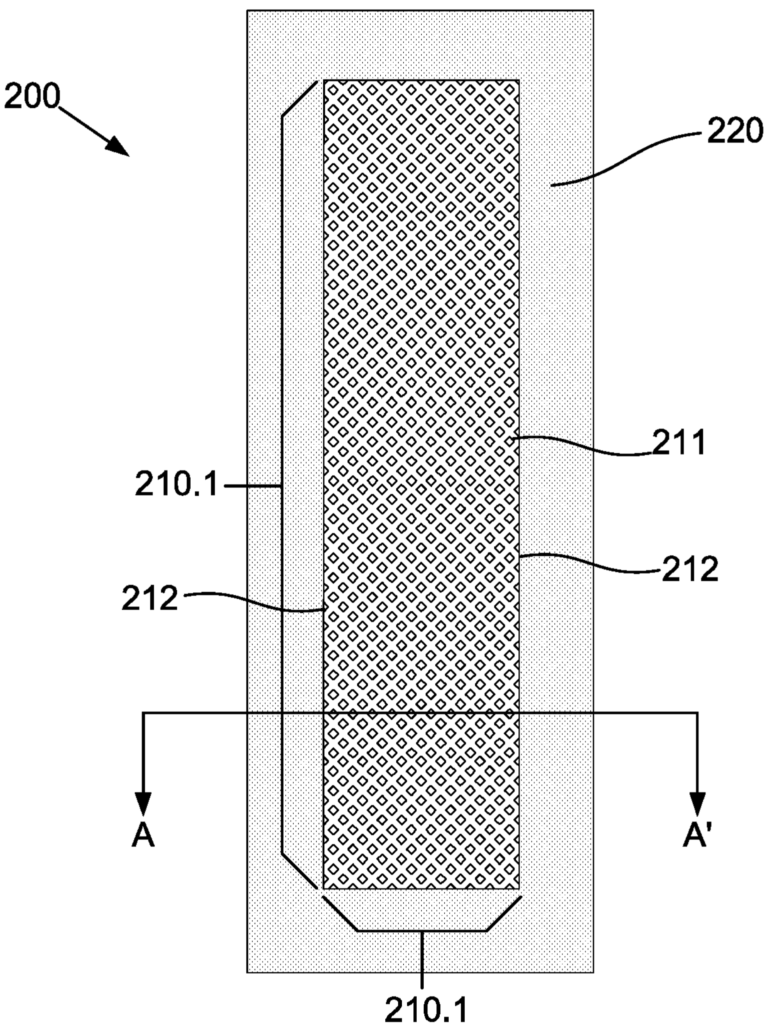
FIG. 2A is a schematic plan view of an example of a phononic circuit component including an acoustic waveguide.
Figure 2B:
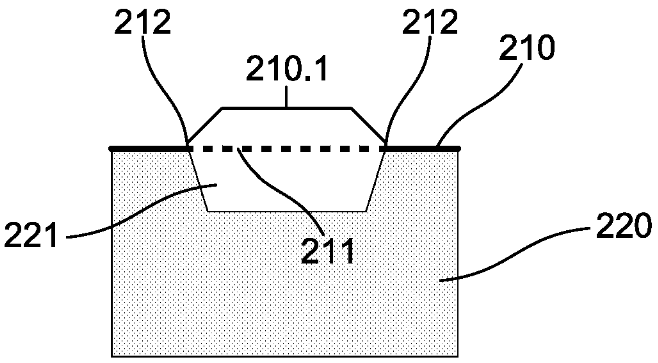
FIG. 2B is a cross sectional view of the acoustic waveguide of FIG. 2A along the line A-A'.

An example of a phononic circuit component will now be described with reference to FIGS. 2A and 2B.

In this example, the phononic circuit component 200 includes a membrane 210 coupled to a substrate 220. The membrane 210 includes a region 210.1, which in this example is a substantially elongate rectangular region, having a two dimensional array of holes 211 therein. A channel 221 is provided in the substrate beneath the region 210.1 so that the region 210.1 is released from the substrate, thereby allowing the region 210.1 to propagate transverse acoustic waves.

The substrate is typically made from a crystalline material, such as silicon or gallium arsenide or sapphire or lithium niobate, whilst the membrane is typically made of silicon nitride or aluminium nitride or silicon carbide or silica, although again other suitable materials could be used.

Typically, the channel 221 is formed by etching the substrate using a wet etching process, dry etch process, vapour etch process or similar, with etchant being applied to the substrate through the holes 211. In this example, the two dimensional array of holes leads to a more even etching process than that achieved using the linear array of holes shown in FIG. 1, in turn leading to a channel having substantially straight parallel edges. Avoiding the presence of depressions and ridges that are present in the arrangement of FIG. 1, reduces reflections of acoustic waves within the region, reducing interference and allowing acoustic waves to be propagated with minimal attenuation.

Figure 2C:
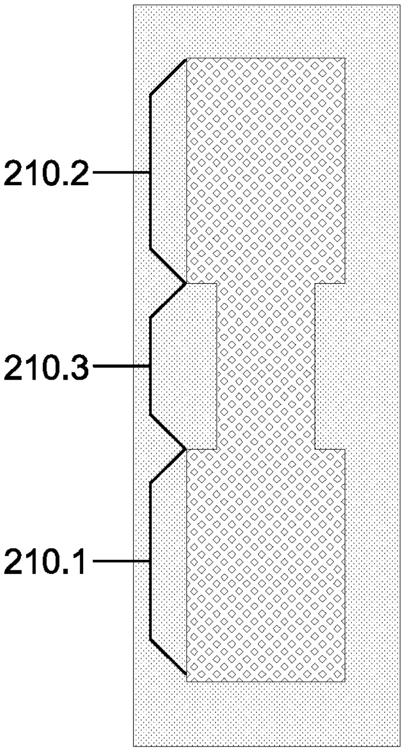
FIG. 2C is a schematic plan view of an example of a phononic circuit including a tunnel region.
Figure 2D:
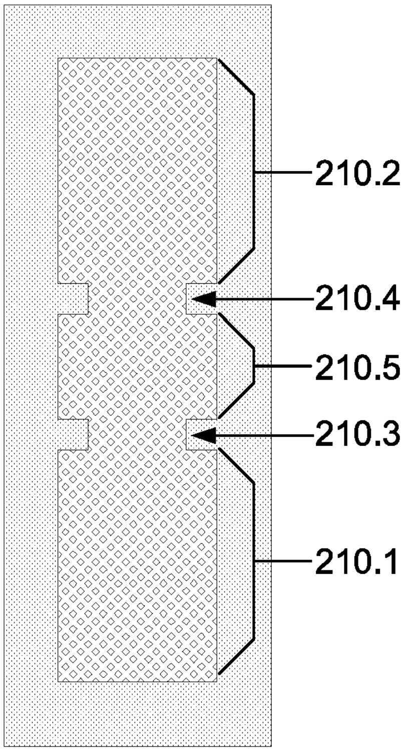
FIG. 2D is a schematic plan view of an example of a phononic circuit including a resonator.
Figure 2E:
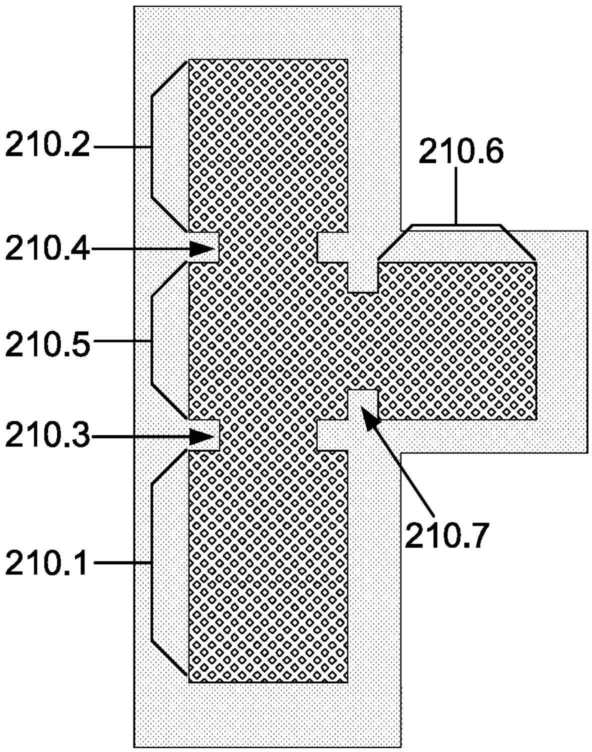
FIG. 2E is a schematic plan view of an example of a phononic circuit including a resonator forming a junction.
Figure 2F:
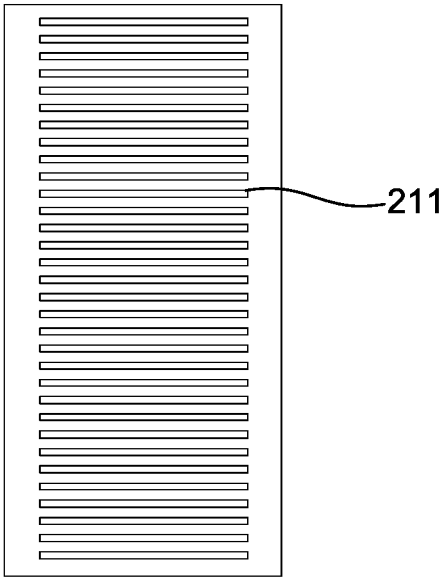
FIG. 2F is a schematic plan view of an example of an alternative hole arrangement.

However, while a two dimensional array of holes is described in the above arrangement, this is not essential and a similar channel arrangement could be achieved using a one dimensional array of holes, for example using rectangular or similar holes extending a significant amount of distance across the region width, as shown in FIG. 2F. Whilst the following description will focus on examples including two dimensional arrays of holes, it should be appreciated that this is not essential and the concepts can be extending to one dimensional linear arrays of holes.

In each of the above example, the holes are spaced by a distance that is substantially smaller than a wavelength of the acoustic waves, such as less than 10% of the wavelength of the acoustic waves, less than 5% of the wavelength of the acoustic waves, less than 2% of the wavelength of the acoustic waves, or less than 1% of the wavelength of the acoustic waves. In this regard, it will be understood that the wavelength of acoustic waves referred to is the lowest order mode of acoustic waves propagated by the region, which in general is governed by the width of the region. Accordingly, it will be appreciated that alternatively, the holes can be spaced by a distance that is substantially smaller than a width of the region, less than 20% of the width of the region, less than 15% of the width of the region, less than 10% of the width of the region, less than 5% of the width of the region or less than 2% of the width of the region.

Minimising the spacing between the holes facilitates propagation of acoustic waves along the region, thereby allowing the channel to be etched evenly, maintaining substantially straight parallel edges, without disrupting propagation of the acoustic waves, and hence avoiding acoustic wave attenuation.

Additionally, the above arrangement allows the holes 211 to have a size that is substantially smaller than a wavelength of the acoustic waves, and hence the width of the region, thereby further reducing interference. Thus, this arrangement can both reduce reflections from the holes themselves, and help ensure that the sidewalls of the waveguide have sub-wavelength scale roughness, in turn reducing scattering from the sidewalls.

In this example, the spaced holes define repeating units with unit having a size that is substantially smaller than a wavelength of the acoustic waves, less than 15% of the wavelength of the acoustic waves, less than 10% of the wavelength of the acoustic waves, less than 5% of the wavelength of the acoustic waves, or less than 2% of the wavelength of the acoustic waves. Similarly, this can be expressed in terms of the region width, in which case the units have a size that is substantially smaller than a width of the region, less than 30% of the width of the region, less than 25% of the width of the region, less than 20% of the width of the region, less than 15% of the width of the region, less than 10% of the width of the region or less than 5% of the width of the region. In this regard, the size of the repeating unit can include a length, aligned with a length of the region, and optionally, in the case of two dimensional hole arrays, a width of the repeating unit, aligned with width of the region.

Accordingly, the above described arrangement allows for the creation of photonic circuit components that have significantly improved propagation characteristics compared to that of prior art arrangements, and this in turn allows these to be used to create more effective phononic circuits.

A number of further features will now be described.

In one example, the region 210.1 extends along a crystal axis of the substrate. This facilitates the etching process, and in particular helps ensure the resulting side walls are substantially straight and parallel.

Typically the array of holes includes a grid of evenly spaced holes, and in particular a grid of evenly spaced holes including rows and columns arranged at 45° relative to one or more region edges. The holes typically are at least one, and more typically, two orders of magnitude smaller than the wavelength of the acoustic waves used in the phononic circuits, to thereby avoid interfering with the acoustic waves.

Alternatively, when a one dimensional linear array of holes are used, these typically extend substantially across a width of the region, and in one example extend across at least 50% of the region, at least 60% of the region, at least 75% of the region, or at least 90% of the region. In this regard, it will be appreciated that the closer the holes 211 approach the edge of the region, the more even the etching of the region edges will be.

The holes 211 can include interior holes arranged away from region edges, edge holes 211 arranged proximate region edges 212 and corner holes 211 arranged proximate region corners. The interior holes are typically square holes, orientated with edges at 45° relative to one or more region edges 212, so that the squares are aligned with the rows and columns. The edge and corner holes are typically half and quarter square holes arranged with a hole edge parallel to a region edge 212 and a vertex pointing away from the region edge 212, or with a vertex pointing into the region corner, respectively. This arrangement of holes 211 is particularly suited for ensuring even etching of the substrate 220 beneath the region 210 to thereby form the channel 221, as will be explained in more detail below. However, it will be appreciated other arrangements of holes could be used, such as circular holes, or the like, and that the hole shape used may vary depending on factors, such as the etching method used.

It will also be appreciated that combinations of different hole patterns could be used, with one dimensional linear arrays of holes being provided along a centre of the region, with edge holes being provided adjacent edges of the region to ensure even etching of the region edges is achieved.

Typically, the component has a respective functionality depending on the shape of the region, and in particular a width of the region, and optionally depending on other parameters, such as the density and thickness of the membrane, the length of the region, the frequency of the acoustic waves, a configuration of the holes, a size of the holes, a shape of the holes, a hole spacing, or the like. For example, different sized holes in a waveguide can be used to modulate the acoustic impedance. In the example of FIGS. 2A and 2B, the region has a rectangular shape with a constant width, which allows the region 210.1 to act as a waveguide and thereby propagate acoustic waves along the region. In this regard, the term waveguide will be understood to include a structure that guides acoustic waves, with minimal loss of energy, by restricting the transmission of the acoustic waves to a single direction, in this case along the waveguide.

The width of the region is typically selected based on a desired cut off frequency for propagation of required acoustic wave modes based on the equation:

$$\Omega_{c,n} = \sqrt{\frac{\sigma}{\rho}\left(\frac{n\pi}{L_x}\right)}$$

where: $\Omega_{c,n}$ is a cut off frequency for mode n $\sigma$ is a membrane tensile stress $\rho$ is a membrane material density $L_x$ is the region width In one example, the membrane typically has a thickness of less than 120 nm; less than 110 nm; less than 100 nm; less than 90 nm; less than 85 nm; at least 40 nm; at least 50 nm; at least 60 nm; at least 70 nm; at least 75 nm; between 75 nm and 85 nm; or about 80 nm. The membrane can be under a tension of less than 10.0 GPa; less than 5.0 GPa; less than 2.0 GPa; less than 1.5 GPa; less than 1.4 GPa; less than 1.3 GPa; less than 1.2 GPa; less than 1.1 GPa; at least 200 MPa; at least 500 MPa; at least 600 MPa; at least 700 MPa; at least 800 MPa; at least 900 MPa; between 900 MPa and 1.1 GPa; or about 1 GPa.

In these conditions, when the region is a single mode waveguide, the region can include a width that is less than 100 μm; less than 90 μm; less than 85 μm; less than 80 μm; at least 75 μm; at least 70 μm; at least 60 μm; at least 50 μm; between 75 μm and 80 μm; or more typically, about 78 μm. Conversely, then the region is a tunnelling region, it can have a width that is less than 70 μm; less than 60 μm; less than 50 μm; at least 40 μm; at least 30 μm; at least 20 μm; at least 10 μm; between 40 μm and 50 μm; or more typically about 44 μm.

It will be appreciated however, that these values are dependent on the nature of the membrane and the frequency of the acoustic waves, and that these parameters are interdependent, so if the tension increases, the required width of the region might decrease, and hence the values outlined above are for illustrative purposes only. It will also be appreciated that significantly smaller regions can be used as a result of miniaturisation.

In any event, it will be appreciated that a suitable combination of acoustic wave frequency and width can allow the region to act as a single or multi-mode acoustic waveguide, or if the width of the region is reduced, a tunnel barrier. If a tunnel barrier is provided, a ratio of reflection to tunnelling is based on a length of the region and an amplitude exponential decay length given by the equation:

$$\gamma = \left(\left(\frac{\pi}{L_x}\right) - \Omega^2 \frac{\rho}{\sigma}\right)^{-1/2}$$

where: $\Omega$ is an acoustic wave frequency
$\gamma$ is the amplitude exponential decay length
$\sigma$ is a membrane tensile stress
$\rho$ is a membrane material density
$L_x$ is the region width In practice, the region can be provided in conjunction with regions having other configurations, allowing additional functionality to be implemented, for example to include pass and/or stop bands, and examples will now be described with reference to FIGS. 2C to 2E.

For example, in the arrangement of FIG. 2C, a phononic circuit is provided including three regions 210.1, 210.2, 210.3, which act as input and output waveguides 210.1, 210.2, and an intervening tunnel barrier 210.3. This can be used for example, to attenuate acoustic waves propagating from the input waveguide 210.1 and the output waveguide 210.2, filter out acoustic wave modes, or the like.

In the example of FIG. 2D, five regions are provided, including input and output waveguides 210.1, 210.2, connected by intervening tunnel barriers 210.3, 210.4, and a wider region that acts as a resonator 210.5. In FIG. 2E, the resonator 210.5 is further connected via a tunnel barrier 210.7 to a third output waveguide 210.6, thereby allowing the resonator 210.5 to act as a junction.

Combining regions in this manner, allows circuits to be created that provide functionality such as power splitting, spatial division multiplexing, filtering, mode cleaning and logic gates, transistors, adders, or the like, as will be described in more detail below.

In one example, the phononic circuits can be configured to mitigate phononic dispersion within a single mode acoustic waveguide. This is typically achieved by providing at least one inverse dispersion waveguide segment that acts as an inverse dispersion region to mitigate phononic dispersion in the single mode acoustic waveguide. Such an arrangement is typically achieved by including larger holes in the inverse dispersion region so as to modulate the acoustic impedance. Typically the single mode acoustic waveguide is coupled to the inverse dispersion waveguide by at least one adiabatic waveguide segment.

Typically, the phononic circuit includes an actuator that generates acoustic waves in at least one of the one or more regions. Whilst any actuator could be used, the actuator is typically an electrostatic actuator or actuator, an interdigitated transducer or actuator, a piezoelectric transducer or actuator or a magnetostrictive transducer or actuator.

In one particular example, an electrostatic actuator can include a first electrode, such as a gold layer, deposited on at least one region and a second electrode spaced from the first electrode. The second electrode, which could be a ground plane electrode, could be positioned in any appropriate location and could be located on an underside of the substrate, or could be provided on a separate substrate positioned above the membrane. The actuator also typically includes a signal generator configured to apply an electric signal between the first and second electrodes so as to electrostatically actuate acoustic waves in the at least one region. In particular, application of a signal to the electrodes can cause the electrodes to be attracted and/or repelled, so that for example, application of an alternating current, can cause the electrodes to oscillate with respect to each other, at a frequency depending on a frequency of the applied signal, thereby inducing acoustic waves in the membrane.

Additionally, the circuit can include a detector that detects acoustic waves in at least one of the one or more regions. The detector can be used, for example, to read acoustic waves that have propagated through the circuit, and any suitable type of detector could be used. For example, the detector could be an electrostatic detector and/or an optical detector.

In the case of an electrostatic detector, this is typically similar to the actuator, in that it includes a first electrode deposited on a region and a second electrode spaced from the first electrode, which again can be position on an underside of the substrate or can be positioned spaced above the membrane. In this instance, the electrodes act as a capacitor, with the capacitance depending on spacing between the electrodes, so that as acoustic waves impinge on the first electrode, this causes the electrode to move and hence causes the capacitance to change. Thus, a sensor can be provided that is configured to sense a capacitance between the first and second electrodes, with the measured capacitance varying depending on the presence of acoustic waves.

It will be appreciated that a method of manufacturing a phononic circuit can also be provided. In this instance, the method includes providing a membrane coupled to a substrate, the membrane including one or more regions, each region having a two dimensional array of holes and wherein the substrate includes a channel beneath each region so that each region is not coupled to the substrate, thereby allowing the one or more regions to propagate transverse acoustic waves.

The method typically further includes creating the array of holes in the membrane to form each region and etching the substrate beneath the holes to create a channel beneath each region. The array of holes can be created using any suitable technique, such as electron beam lithography, UV photolithography, reactive ion etching, or the like. Similarly, the method of etching the substrate typically involves using anisotropic wet etching, or the like. Alternatively, a sacrificial layer can be grown between the silicon nitride layer and the silicon handle wafer. This sacrificial layer may be made of silicon oxide, enabling vapor-phase selective release of the membrane (for instance through the use of hydrofluoric acid vapor). This dry-release method eliminates the need for critical-point drying.

Further details of specific examples of phononic circuitry architecture based on transverse acoustic waves will now be described.

Specifically this will examine experiments performed to allow for the observation of transverse tunnelling, and the construction of mode-selective acoustic mirrors and spatial mode filters on a silicon chip. Capabilities of this form are required for spatial mode multiplexing and mode-cleaning in phononic circuits. Additionally, two dimensional imaging of the tunnelling process is performed, allowing visualisation of acoustic waves at a level of detail that has not previously been possible.

In one example, the phononic circuits employ sequential patterns of engineered phononic pass and stop bands within single-mode acoustic waveguides. Single-mode operation offers immunity to deleterious effects such as modal dispersion, spatial mode mismatch, and scattering from defects. The fabrication is CMOS-compatible, allowing the construction of complex phononic devices from a pattern of sub-wavelength-scale holes in a thin membrane. Together, this provides a pathway for scalable phononic circuitry using transverse waves, with broad applications from distributed sensing to nonlinear phononics.

Figure 3:
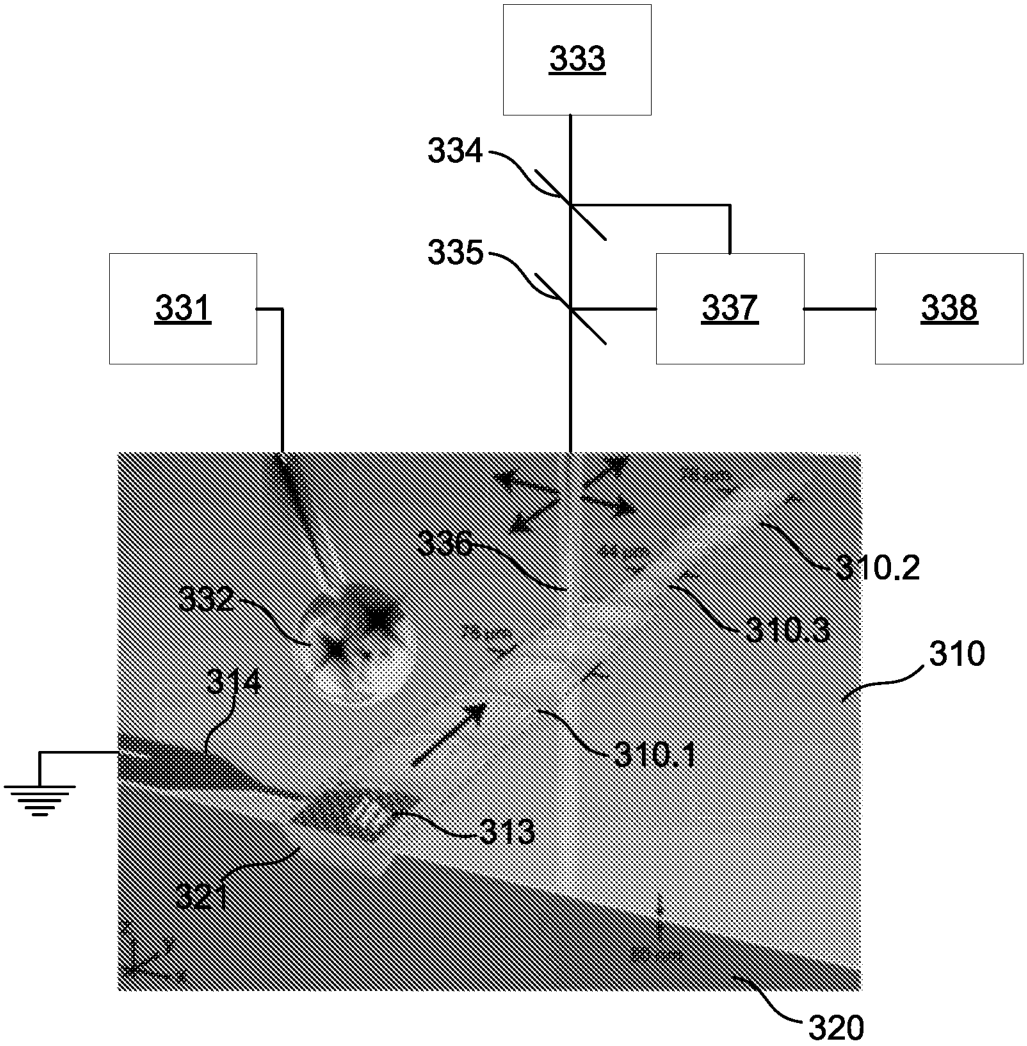
FIG. 3 is a schematic diagram of an example of an experimental phononic circuit including an input waveguide, a tunnel barrier and an output waveguide.

The devices described in these examples are made from a thin (~80 nm), highly stressed, silicon nitride ($Si_3N_4$) membrane grown upon a silicon (Si) wafer, and an example arrangement is shown in FIG. 3.

In this example, the phononic circuit includes an input waveguide 310.1, a tunnel barrier 310.3 and an output waveguide 310.2, made out of an 80 nm thick silicon nitride membrane 310 provided on a silicon substrate 320. The membrane 310 includes holes in the regions defining the waveguides 310.1, 310.2 and tunnel barrier 310.3, which are used to wet etch a channel 321 in the substrate so that the membrane is released in those regions. Once released from the silicon, these membranes support acoustic waves with motion predominantly in the out-of-plane direction (aligned with the Z-axis).

To induce acoustic waves a signal generator 331 is provided connected to an electrode 332 suspended ~2 μm above a gold on-chip electrode 313 deposited on the input waveguide 310.1, and connected via an on-chip connection 314 to ground. The signal generator electrostatically excites the device at a drive frequency $2\pi\times\Omega$ and 0 dBm and is connected to a 30 V DC supply, amplified by 25 dBm. An optical system is used to detect acoustic waves in the membrane 310. The optical system includes a laser 333 that generates a beam that passes through beam splitters 334, 335, and passes along a lensed optical fibre beam 336, exposing the membrane to radiation, with radiation reflected from the membrane 310 being returned to a heterodyne detector 337 and spectrum analyser 338 that are used to detect movement of the membrane 310, and hence the presence of acoustic waves.

The membrane motion u(x, y, t) obeys a standard two-dimensional wave equation:

$$\sigma\nabla^2 u(x, y, t) - \rho\frac{\partial^2}{\partial t^2}u(x, y, t) = 0, \tag{1}$$

where σ is the tensile stress of the membrane and ρ is the density of the membrane material. When driven at frequency Ω, the solutions of the wave equation propagating in the y-direction can be decomposed into transverse modes:

$$u(x, y, t) = \sum_n U_n\phi_n(x)\phi_n(y)e^{-i(\Omega t+\phi_n)} \tag{2}$$

where x is the transverse direction, $U_n$ and $\theta_n$ are the amplitude and phase of the $n^{th}$ mode, respectively, $\phi_n(x)=\sin(k_x x)$ is the transverse mode shape with wave number $k_x=n\pi/L_x$, $L_x$ the width of the waveguide, and $\phi_n(y)=e^{\pm ik_y y}$ is the longitudinal mode shape in the direction of propagation with wave number $k_y$. The dispersion relation:

$$\Omega = \sqrt{\frac{\sigma}{\rho}}\sqrt{k_y^2+\left(\frac{n\pi}{L_x}\right)^2} \tag{3}$$

can be calculated directly from the wave equation for each mode n. From this equation, one can see that each mode has a cut off frequency, $$\Omega_{c,n} = \sqrt{\frac{\sigma}{\rho}}\left(\frac{n\pi}{L_x}\right) \tag{4}$$

below which the wave number $k_y$ is imaginary.

Therefore if the mode n is excited at a frequency below $\Omega_{c,n}$, the excitation can not propagate and will decay exponentially. Thus, there will be a range of frequencies ($\Omega<\Omega_{c,1}$) where no mode can propagate, followed by a range of frequencies ($\Omega_{c,1}<\Omega<\Omega_{c,2}$) where only the first transverse mode is allowed and the system is single-mode. This allows acoustic tunnelling to be performed. Above the second transverse mode cut off frequency, $\Omega>\Omega_{c,2}$, the membrane can support several acoustic modes and becomes multi-mode.

The arrangement shown in FIG. 3, includes the input waveguide 310.1 connected to a narrower-width tunnel barrier 310.3, which is in turn connected to the output waveguide 310.2, which has the same width as the input waveguide. Since the dispersion relation depends on the width of the waveguide, the input and output waveguides have different dispersion relations to that of the tunnel barrier, which leads to different first mode cut off frequencies ($\Omega_{c,1}^{guides}$ and $\Omega_{c,1}^{barrier}$), and to different operating regimes depending on the excitation frequency Ω.

Figures 4A, 4B, 4C, 4D, 4E, 4F:
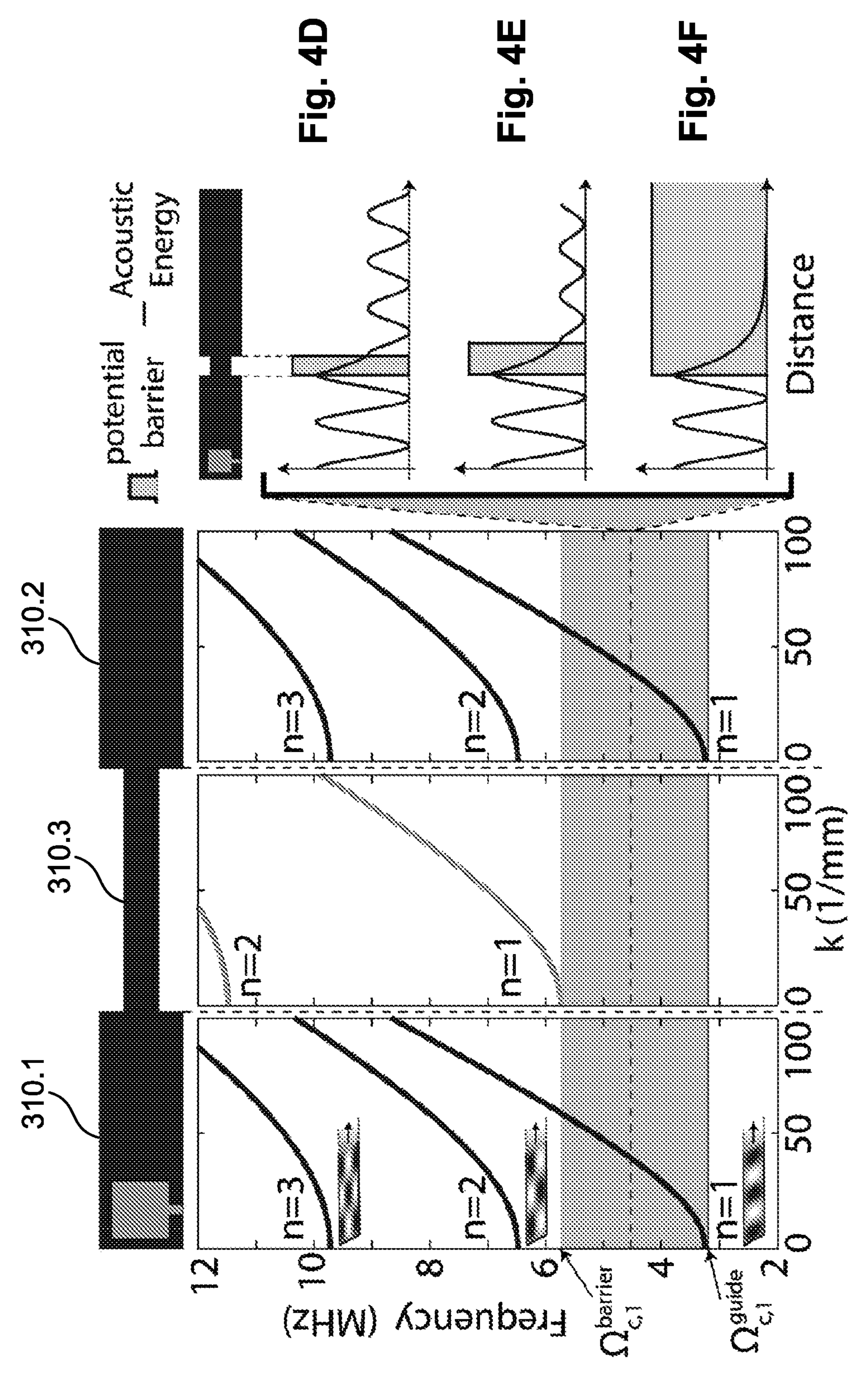
FIGS. 4A to 4C are graphs illustrating a phononic dispersion relation for the input waveguide, tunnel barrier and output waveguide of FIG. 3, respectively.
FIGS. 4D to 4F are graphs illustrating the effect of different length tunnel barriers on propagation of acoustic waves through the circuit of FIG. 3.

FIGS. 4A to 4C show phononic dispersion relations of the input waveguide, barrier and output waveguide respectively. Mode profiles calculated from equation (2) are shown as inset images in FIG. 4A for the first three modes (n=1; 2; 3). The grey shaded region in FIGS. 4A, 4B and 4C indicates the frequency band within the single-mode tunnelling regime. FIGS. 4D to 4F show three one-dimensional examples of different tunnel barrier lengths, which illustrate different coupling configurations between the input and output waveguides for a frequency in the single-mode tunnelling regime. The tunnel barrier length is 0.2γ, 0.5γ and 3γ in FIGS. 4D to 4F, respectively.

If $\Omega_{c,1}^{guides}<\Omega_{c,1}^{barrier}$ the acoustic wave can propagate in the guides via its first transverse mode but decays exponentially in the tunnel barrier, partially reflecting and partially tunnelling into the output waveguide, as demonstrated by the graphs shown in FIGS. 4D to 4F. This range of frequencies, where the device acts as an acoustic mirror with controllable reflectivity, is referred to as a "single-mode tunnelling regime". The ratio of reflection to tunnelling depends on the magnitude of the exponential decay, and therefore on both the length of the tunnel barrier and the amplitude exponential decay length γ. For frequencies within the single-mode tunnelling regime, γ is given by:

$$\gamma = \left(\left(\frac{\pi}{L_x}\right)^2 - \Omega^2\frac{\rho}{\sigma}\right)^{-1/2}. \tag{5}$$

Thus, the strength of the coupling between the two waveguides can be engineered by carefully choosing the length of the tunnel barrier or the driving frequency. The closer the frequency to $\Omega_{c,1}^{barrier}$, the stronger the coupling is. Indeed, $\Omega_{c,1}^{barri}$ is approached the decay length of the wave approaches infinity so that the acoustic wave is barely attenuated.

On the other hand, at frequencies close to $\Omega_{c,1}^{guide}$ the decay length reaches a minimum of $\pi\sqrt{(1/L_x^{barrier})^2-(1/L_x^{guide})^2}$ leading to maximal attenuation.

Membrane Fabrication

An example fabrication process will now be described with reference to FIGS. 5A to 5H.

Figure 1:
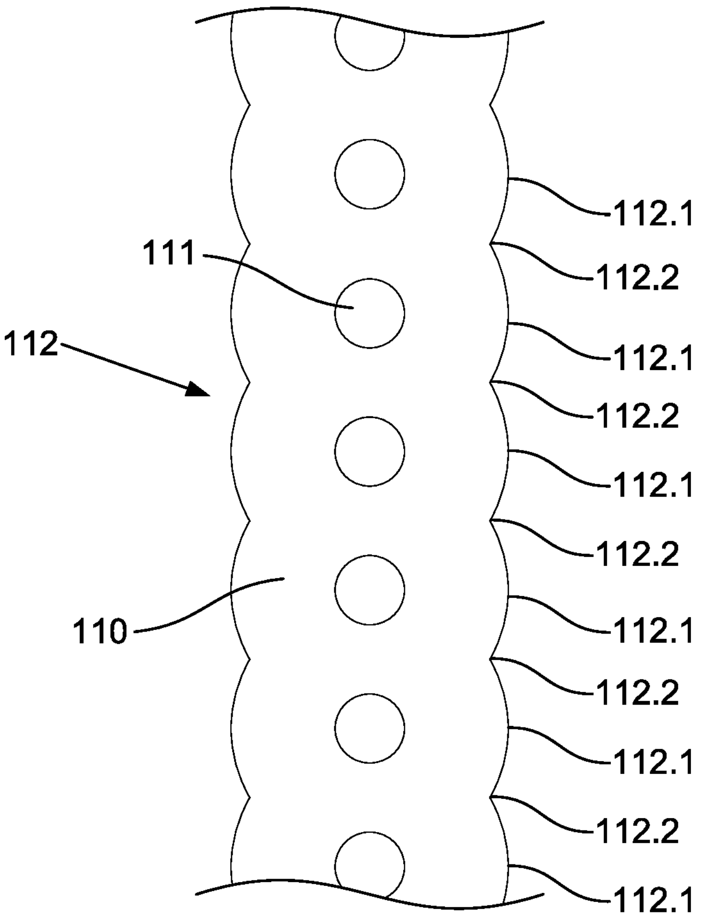
PRIOR ART Fig. 1
FIG. 1 is a schematic plan view of a prior art acoustic waveguide.

In this regard, FIG. 5A is a schematic diagram of a meshed silicon nitride membrane 310 released from the silicon substrate 320 via channel 321, and with a gold actuation electrode 313 provided thereon. FIGS. 5B1 and 5B2 show finite element simulations showing the transverse mode profile of the first (n=1) and second (n=2) acoustic modes of the meshed waveguide, respectively. FIGS. 5C and 5D are schematic diagrams of a snapshot of the chip during the wet etch, showing holes 311.1, edge holes 311.2 and corner holes 311.3, and white arrows indicating progression of etching of the underlying substrate 320. FIG. 5E is an optical microscope image of the resulting input waveguide 310.1 with a meshed gold electrode 313, the tunnel barrier 310.3 and output waveguide 310.2. FIGS. 5F to 5H are additional false color scanning electron micrographs of the actuation region.

The phononic devices are fabricated on a chip from a commercial wafer with an ~80 nm stoichiometric $Si_3N_4$ film (LPCVD deposition, initial tensile stress σ0=1 GPa) deposited on a silicon substrate. The arrangement uses a far sub-wavelength hole pattern through which the underlying silicon substrate can be etched away from the front-side. The hole pattern results in a "meshed" silicon nitride membrane, and in one example is formed through a combination of electron beam lithography and reactive ion etching.

The hole pattern consists of square holes of 1 μm by 1 μm periodically separated (center to center) by 3 μm. These lengths are approximately two orders of magnitude smaller than the typical wavelengths of the guided acoustic waves. Therefore, the interaction of the supported acoustic waves with the holes is greatly suppressed, leaving the dispersion relation equation (3) essentially unaffected, with only the ratio $\sqrt{\sigma/\rho}$ reduced by 12% compared to a non-patterned membrane. In this regard, compared to a typical non-patterned membrane, the mesh on the silicon nitride causes the membrane to relax leading to an effective stress equal to $\sigma=\sigma_0(1-\nu)$ (40), where $\sigma_0$=1 GPa is the deposition tensile stress of the non-patterned silicon nitride and ν=0.22 the Poisson's ratio of silicon nitride. The effective stress of the meshed membrane is therefore equal to σ=0.88 GPa and its density is the density of the silicon nitride, ρ=3, 200 kg/m3. This relaxation is verified through finite element simulations of the n=1 and n=2 transverse modes of a meshed membranes shown in FIGS. 5B1 and 5B2, respectively, which show no apparent differences in mode shape from the corresponding acoustic waves.

Gold electrodes employed for electrostatic actuation are patterned via gold evaporation followed by a lift-off process. Specifically, the electrodes are patterned using electron beam lithography on a double layer of polymethyl methacrylate (PMMA) resist, followed by 50 nm of gold evaporation and lift-off. The mesh array is aligned to the gold electrodes and patterned using AR-P electron beam resist. The mesh is formed by etching the exposed $Si_3N_4$ film using reactive ion etching with a plasma of $CHF_3$ and $SF_6$. The AR-P resist is then stripped off with oxygen plasma.

The membrane is then released through anisotropic wet etching of the underlying silicon substrate using a potassium hydroxide (KOH) solution, and in particular a solution of low concentration potassium hydroxide (KOH) combined with isopropyl alcohol. Etching moves progressively outwardly from the holes, as shown by the white arrows, until the channel under the membrane is formed. Once the membrane is released, the chip is dried in a $CO_2$ critical point dryer. Aligning the waveguides along the [011] crystal axis results in near atomically smooth side-walls, as shown in FIGS. 5C and 5D.

A real color optical image of the phononic device is shown in FIG. 5E, where the blue region corresponds to the $Si_3N_4$ film on silicon, the gray region to the released meshed membrane and the yellow to the meshed gold electrode. The yellow, red and blue frames respectively enclose the on-chip electrode, the tunnel barrier and the end of the output waveguide. Scanning electron images of these regions are shown in FIGS. 5F to 5H respectively. These demonstrate that the planar edge side-walls closely following the pattern of holes, and that features smaller than 10 μm can be achieved in the released membrane using this technique. Despite the high initial tensile stress, the process is remarkably robust, generally achieving yields of 100% for chips containing as many as 48 devices.

Setup

Devices were fabricated with input and output waveguide widths of $L_x$=78 μm and a tunnel barrier width of $L_x$=44 μm. The input and output waveguides are 1 mm long in the direction of propagation (y-direction) and different tunnel barrier lengths are investigated. Given the choice of widths and the other parameters specified in the previous section, the cut-off frequency of the first mode of the guides and the tunnel barrier are found from equation (4) to be $\Omega_{c,1}^{guide}/2\pi$=3.2 MHz and $\Omega_{c,1}^{barrier}/2\pi$=5.6 MHz, respectively. This provides a frequency band of 2.3 MHz, grey shading in FIGS. 4A to 4C, for which single-mode acoustic tunnelling can be investigated.

Acoustic waves are launched into the device through electrostatic actuation between the on-chip electrode 313 and the suspended electrode 332, as shown in FIG. 3. To detect motion of the membrane, the optical heterodyne detection system is used as shown in FIG. 3, where a laser probe field is focused onto the silicon nitride membrane with a lensed fibre. The reflection from the membrane back into the lensed fibre is interfered with a local oscillator beam offset by a frequency of 77 MHz from the probe. Once detected, this interference creates a photocurrent with two beat-notes at frequencies 2π×77 MHz±Ω, as described for example in "*Evanescent singlemolecule biosensing with quantum-limited precision*" by N P Mauranyapin, L S Madsen, M A Taylor, M Waleed, and W P Bowen, Nature Photonics, 11:477, (2017) and "*Propagation and Imaging of Mechanical Waves in a Highly Stressed Single-Mode Acoustic Waveguide*" by E. Romero, R. Kalra, N. P. Mauranyapin, C. G. Baker, C. Meng, and W. P. Bowen, Phys. Rev. Applied, 11:064035, (2019).

The amplitude of the beat note is, to first order, proportional to the amplitude of the membrane motion at the point of focus of the lensed fibre. Therefore, by scanning the lensed fibre across and along the device, it is possible to can determine the amplitude of an acoustic wave at any position.

Experiments are performed in a high vacuum chamber (pressure 10-7 mbar) to eliminate any air damping of the membrane motion.

Results

Exponential Decay

First investigations were performed regarding how the acoustic wave decays in the tunnel barrier. To do this, a device with a 150 μm long tunnel barrier is used, which is significantly longer than the typical acoustic wave decay length in the barrier. Results are shown in FIGS. 6A to 6C.

To investigate the response of the device, a network analysis was performed as shown in FIG. 6C, with the lensed fibre placed in the middle of the input waveguide ($x=0.5L_x$ and $y=0.5L_y$). A resulting extracted evanescent decay constant versus drive frequency measured at the point shown in FIG. 6C indicated by the dashed lines are shown in FIG. 6D, with error bars being calculated from the standard deviation over 6 different scans for each frequency. The red theoretical line is obtained from equation (5) with no fitting parameter.

The cut off frequency of the waveguide and tunnel barrier first mode are displayed in red and calculated using the above described equations. No response was observed from the device at frequencies below ~3.5 MHz, consistent with the theoretical cut-off frequency of the waveguide of 3.2 MHz. Above this frequency, a series of resonant peaks were observed as expected due to the finite dimensions of the device, with impedance mismatch between the released silicon nitride membrane and the silicon substrate causing reflection of the acoustic wave at each end of the input waveguide.

The quality factors of the observed resonances can be used to provide an upper bound on the losses of the acoustic wave during propagation. Quality factors as high as 5,000 were observed, which corresponds to a loss per unit length as low as 0.4 dB $cm^{-1}$. This represents a propagation loss far lower than achieved for megahertz frequencies in a phononic waveguides created using other techniques at room temperature. This indicates an absence of additional damping introduced by the sub-wavelength mesh used for fabrication.

Amplitude enhancement provided by these resonances was used to investigate how the acoustic wave decays in the tunnel barrier. In this regard, FIG. 6A is a schematic diagram of the one-dimensional scanning scheme, in which the lensed fibre is scanned from the input waveguide 310.1 to the end of the tunnel barrier 310.3 along a centre of the waveguide (at $x=0.5L_x$) at a rate of 10 steps per second with a step size varying from scan to scan between 880 to 900 nm. The amplitude of the mechanical signal is recorded on a spectrum analyser at 0 span and 10 Hz resolution bandwidth.

Results of the experimental scan of the input waveguide and tunnel barrier are shown in FIG. 6B, which shows the measured acoustic wave versus the scanning distance for a typical scan at a driving frequency of 4.919 MHz. The power of the acoustic wave (in dB) is plotted versus the distance scanned by the fibre along the direction of propagation (y). The coordinate y=0 corresponds to the junction between the input waveguide and the tunnel barrier. Theoretical prediction is calculated from the amplitude of the wave at the guide/tunnel barrier interface (distance axis=0 μm) with no fitting parameter.

For y>0, the acoustic wave amplitude decays exponentially in the tunnel barrier as expected for this frequency. For y<0, standing wave oscillations are observed as expected due to the resonant nature of the input waveguide. Indeed, because of the reflections at both ends of the input and output waveguide, the wave will propagate in both positive and negative y-directions.

The longitudinal mode shape $\phi(y)$ can then be expressed as $\phi(y)=\sin(k_y y)$ with $k_y=m\pi/L^*_y$, where m an integer representing the longitudinal mode number and $L^*_y$ is the effective length of the guide in the y-direction accounting for a few percent change of $L_y$ due to the soft boundary condition with the tunnel barrier. The red line in FIG. 6B corresponds to the theoretical decay expected for an acoustic wave at frequency 4.919 MHz. The good agreement with the experimental data verifies that the simple model presented in the theoretical section is appropriate for our experimentally fabricated devices.

To map the dependence of γ with the drive frequency, this process was repeated for seven different drive frequencies (corresponding to the peaks shown in FIG. 6C). The results are shown in FIG. 6D and compared to the theoretical prediction of equation (5) without any fitting parameters. As expected, the decay length increases with frequency and tends to infinity as the cut-off frequency of the first mode of the tunnel barrier is approached. This experimentally demonstrates that varying the drive frequency provides the ability to tune the decay length by more than a factor of four. The good agreement with theory demonstrates that the phononic decay can be precisely and reliably engineered, opening a path toward scalable phononic circuitry.

Imaging Acoustic Tunnelling

Imaging has previously been used to observe acoustic radiation losses from beam resonators and to monitor the motion of isolated mechanical resonators within a phononic shield. In this instance, it is used to observe and quantify acoustic tunnelling similar to the evanescent coupling widely used in photonics, and an example of this will now be described in more detail with reference to FIGS. 7A to 7C.

Figure 7A:
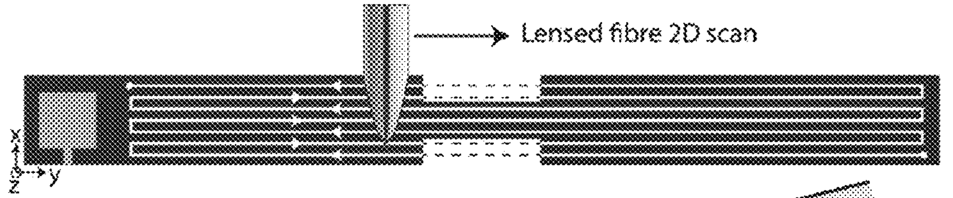
FIG. 7A is a schematic plan view of an example of a scanning pattern for reading acoustic waves in a phononic circuit including an input waveguide, tunnel barrier and output waveguide.

As shown in FIG. 7A the lensed fibre from the previous examples can be raster scanned in both x and y-directions, to allow two-dimensional images of the acoustic wave to be recorded. In this process, for each position, the amplitude of the wave is recorded with a spectrum analyser at zero span at frequency $2\pi\times77$ MHz+Ω. Different scans for all the x-positions are assembled in post processing.

Figure 7B:
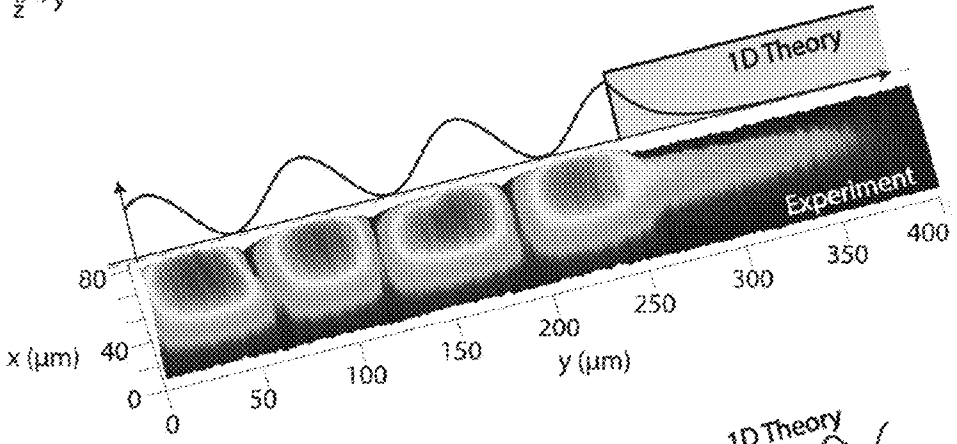
FIG. 7B is a schematic diagram illustrating a comparison between theoretical and measured acoustic wave power for acoustic waves undergoing exponential decay.
Figure 7C:
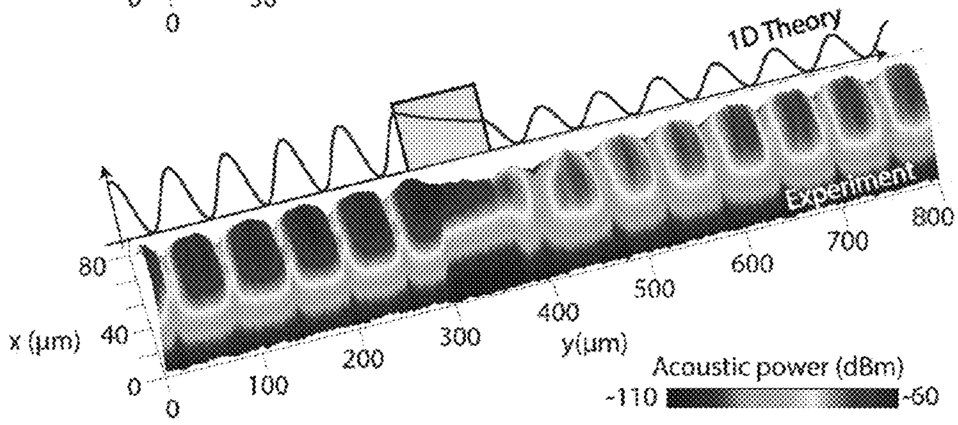
FIG. 7C is a schematic diagram illustrating a comparison between theoretical and measured acoustic wave power for acoustic waves undergoing tunnelling.

FIGS. 7B and 7C show measurements from two-dimensional scans of two different devices, with the experimental data smoothed with a Gaussian filter. In FIG. 7B, the device has a tunnel barrier of 150 μm length and the image is recorded for a driving frequency of 5.4 MHz. The top schematic in FIG. 5B shows a theoretical prediction of the acoustic wave power, whilst the bottom schematic represents the measured power. This shows a resonant wave is observed in the input waveguide, which then exponentially decays below the noise floor in the tunnel barrier with the acoustic wave fully reflecting. This is expected at this frequency because the decay length of the wave is around 42 μm (see FIG. 6B) which is three times smaller than the tunnel barrier length.

The second device of FIG. 7C has a shorter 75 μm long tunnel barrier and is driven at a frequency of 5.603 MHz. In this instance, resonance is observed in the input waveguide, then a short exponential decay in the tunnel barrier followed by resonant build up again in the output waveguide. Over all, transmission through the tunnel barrier of 10% is observed.

Acoustic Mode Filtering

To illustrate one application of the ability to engineer acoustic wave tunnelling, acoustic spatial mode filtering will now be considered. Acoustic spatial mode filtering is an important capability for phononic circuitry. Similarly to photonics, it allows spatial mode multiplexing, control of spatial dispersion, and filtering of scattering from defects, among other prospective applications. Here, it is demonstrated by arranging a scenario where both guides can support the first two transverse modes but the tunnel barrier remains in the single-mode regime. In this case, if both modes are excited in the input waveguide, only the first transverse mode will be allowed to transmit through the barrier into the output waveguide, with the second mode fully reflected.

This regime can be achieved by driving the device at frequencies below the second mode cut off frequency of the barrier $\Omega_{c,2}^{barrier}/2\pi=11.5$ MHz and between the second and third mode cut off frequencies of the waveguides, $\Omega_{c,2}^{guide}/2\pi=6.5$ MHz and $\Omega_{c,3}^{guide}/2\pi=9.7$ MHz respectively, so that $\Omega_{c,2}^{guide}<\Omega<\Omega_{c,3}^{guide}$.

Figures 8A, 8B, 8C, 8D:
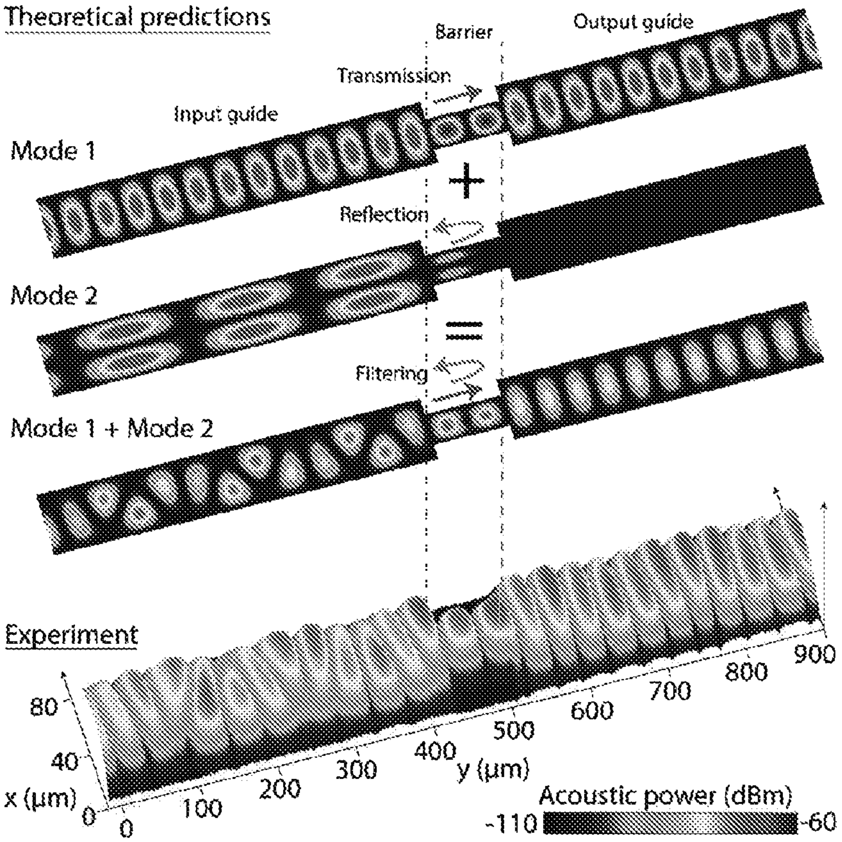
FIG. 8A is a schematic diagram of an example of a theoretical acoustic wave power for a first mode acoustic wave in a phononic circuit including an input waveguide, tunnel barrier and output waveguide.
FIG. 8B is a schematic diagram of an example of a theoretical acoustic wave power for a second mode acoustic wave in the phononic circuit of FIG. 8A.
FIG. 8C is a schematic diagram of an example of a theoretical acoustic wave power for combined first and second mode acoustic waves in the phononic circuit of FIG. 8A.
FIG. 8D is a schematic diagram of an example of a measured acoustic wave power for combined first and second mode acoustic waves in the phononic circuit of FIG. 8A.

FIGS. 8A and 8B show theoretical predictions of the propagation of the first and second acoustic modes in the waveguides, respectively. If both modes are driven simultaneously, they will interfere creating spatial patterns such as shown in FIG. 8C. Choosing an 8.1 MHz excitation frequency, the decay length of the second mode is estimated, (using equation (5) adapted for the second transverse mode), to be around 7 μm. After a 75 μm long tunnel barrier, this is predicted to exponentially reduce the power in the second mode by a factor of $2\times10^9$ (or −93 dB). The first mode, on the other hand, passes essentially unaffected, meaning the second transverse mode is spatially filtered by the device.

FIG. 8D shows an experimental image of the acoustic propagation in this configuration, illustrating the experimental results are consistent with the theory, showing clear acoustic mode filtering.

Mode Division Multiplexing

Figures 9A, 9B, 9C, 9D, 9E:
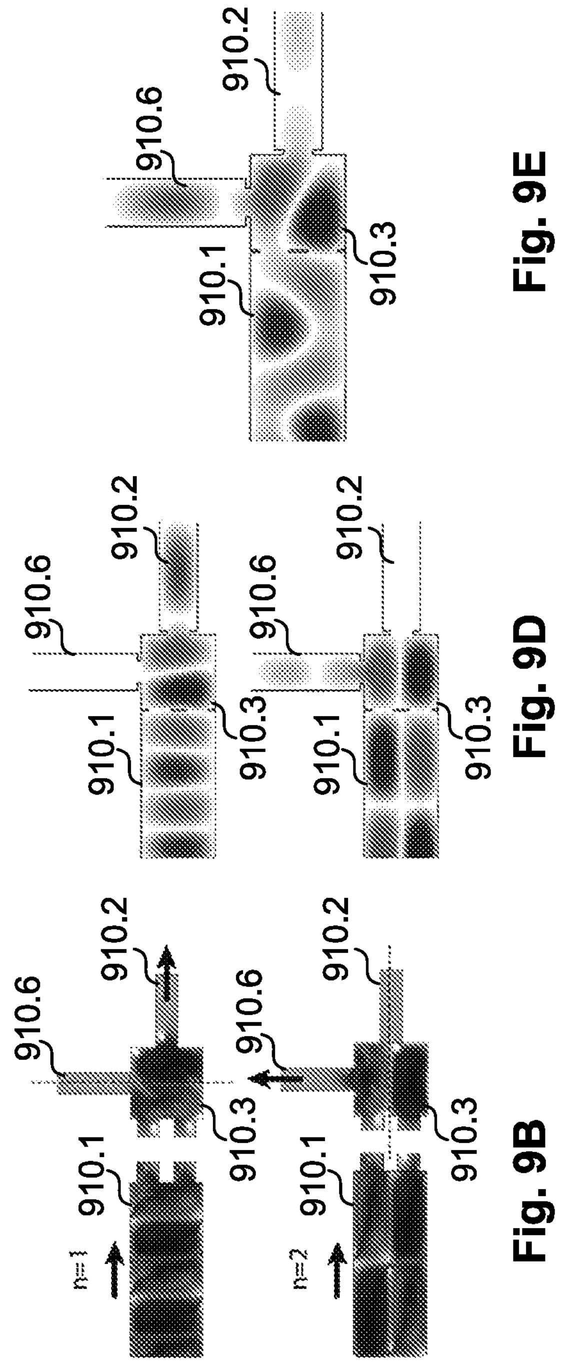
FIG. 9A is a schematic plan view of an example of a phononic circuit for mode division multiplexing showing a first mode acoustic wave.
FIG. 9B is a schematic plan view of an example of the phononic circuit of FIG. 9A showing a second mode acoustic wave.
FIG. 9C is a schematic plan view of an example of finite-difference time-domain simulations for the first mode of FIG. 9A.
FIG. 9D is a schematic plan view of an example of finite-difference time-domain simulations for the second mode of FIG. 9B.
FIG. 9E is a schematic plan view of an example of finite-difference time-domain simulations for the first and second modes.

An example of mode division multiplexing will now be described with reference to FIGS. 9A to 9C.

In this example, a circuit is formed from an input waveguide 910.1, coupled to a square region that acts a resonator 910.3, which is in turn connected to first and second output waveguides 910.2, 910.6. The acoustic resonator 910.3 is coupled to the input and output waveguides via respective tunnel barriers (not labelled).

The width of the input waveguide 910.1 is designed to allow two acoustic modes to propagate, whilst coupling of the output waveguides 910.2, 910.6 is configured so that the resonator is controlled so each mode exits the resonator via a respective waveguide. This is shown in FIG. 9A, which show the first mode exiting the resonator 910.3 via the first output waveguide 910.2, and FIG. 9B, which shows the second mode existing via the second waveguide 910.6. Corresponding finite-difference time-domain simulations are shown in FIGS. 9C, 9D and 9E, for first mode only, second mode only and both mode excitations, resulting in acoustic modes in the first output waveguide 910.2 only, the second output waveguide 910.6 only and both output waveguides 910.2, 910.6, respectively.

Junction Output Control

Figure 10A:
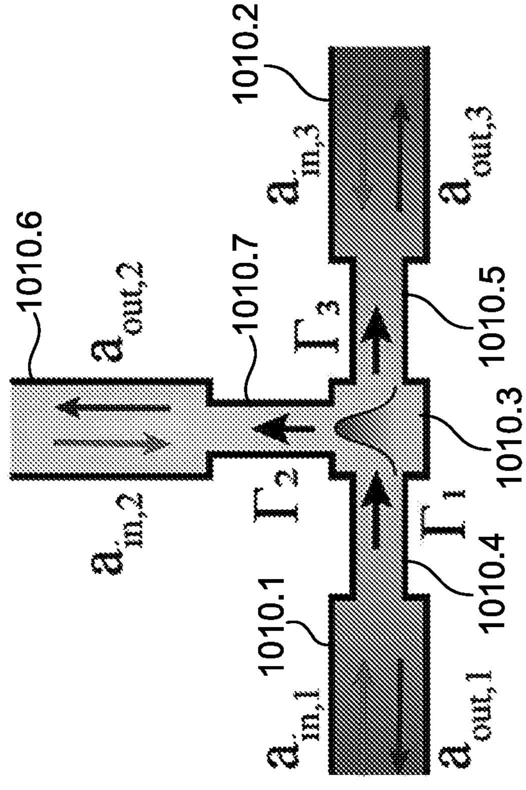
FIG. 10A is a schematic plan view of an example of a phononic circuit including a junction configured to control acoustic wave powers at two output waveguides.
Figure 10B:
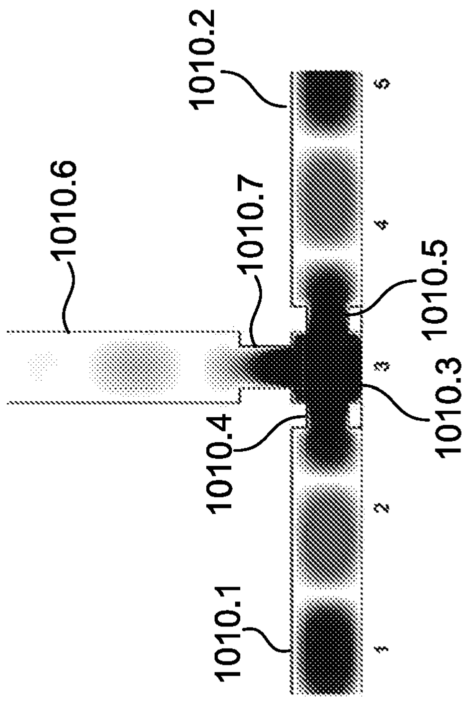
FIG. 10B is a schematic plan view of an example of finite-difference time-domain simulations for the phononic circuit of FIG. 10A.

Another important tool is to be able to construct junctions in which it is possible to engineer the ratio of powers going into each junction, and an example of this is shown in FIGS. 10A and 10B.

In this example, control is achieved by controlling the coupling rates into resonator 1010.3 for three single mode waveguides 1010.1, 1010.2, 1010.6, for example by adjusting properties such as the dimensions of tunnelling barriers connecting each of the waveguides to the resonator 1010.3.

Logic Gates

A variety of logic gates can be constructed using the above described components.

Figure 11A:
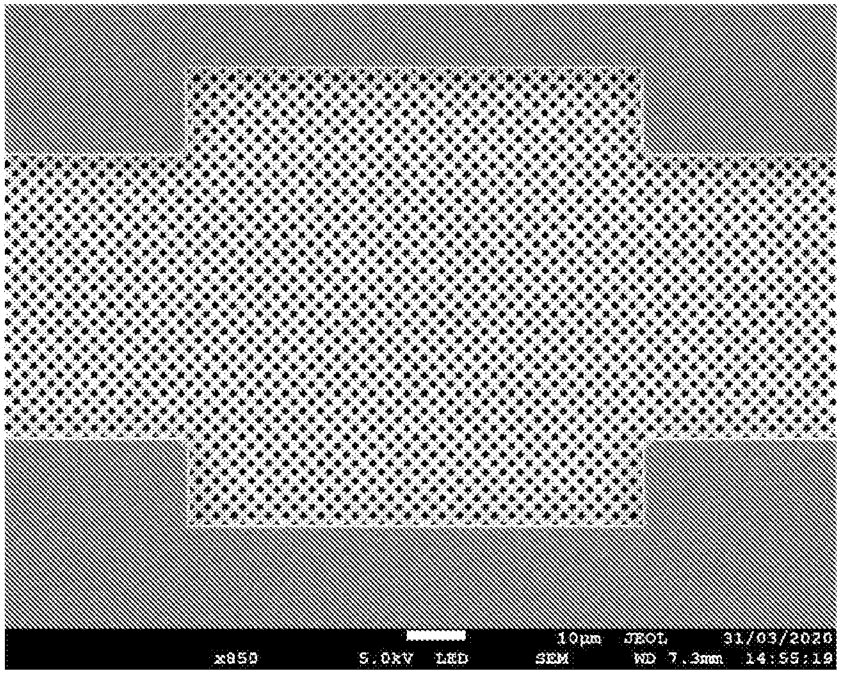
FIG. 11A is a schematic diagram of an example of a resonator formed by a short section of single-mode waveguide between two tunnel barriers.
Figure 11B:
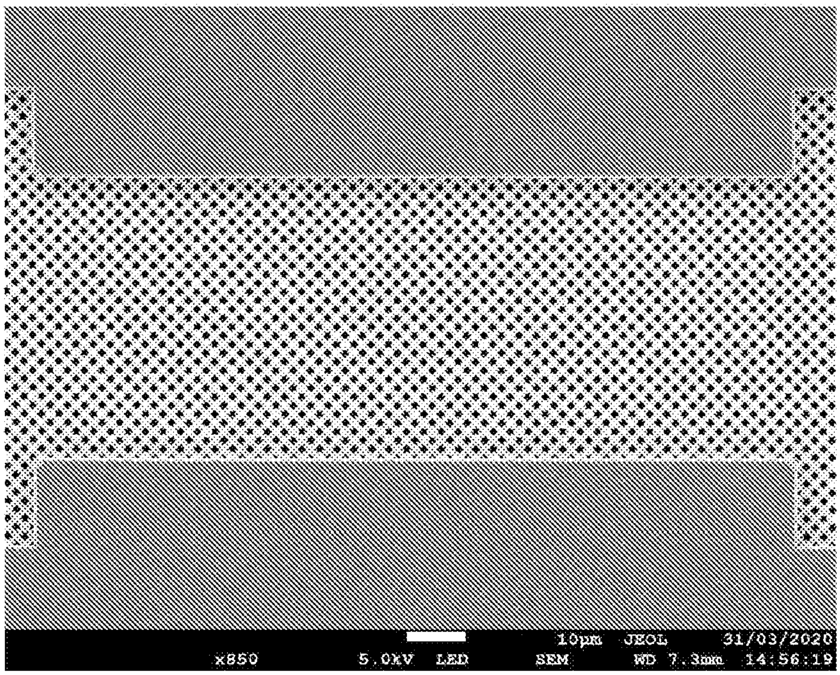
FIG. 11B is a schematic diagram of an example of a tunnel barrier for coupling an input waveguide to the resonator of FIG. 11A.

For example, an XOR gate can be constructed from a square region of ~80 μm×~80 μm shown in FIG. 11A, connected to an input waveguide having a similar ~80 μm width through a tunnel barrier formed from a region ~50 μm width and 180 μm long, shown in FIG. 11B. In this example, the input waveguide extends over a few millimeters.

Example inputs and the resulting output are shown in FIGS. 12A to 12D. In this example, the table of FIG. 12A shows different input configurations provided by acoustic waves shown in FIGS. 12B and 12C respectively, resulting in the output acoustic waves of FIG. 12D, thereby demonstrating XOR gate functionality.

Transistor

Figure 13:
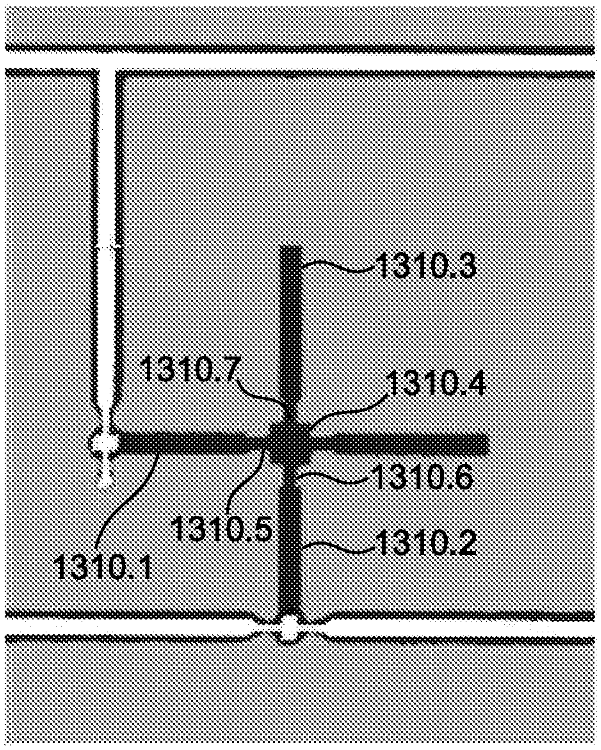
FIG. 13 is a schematic diagram of an example of a phononic circuit forming a transistor.

An example of a transistor is shown in FIG. 13.

In this example, the transistor includes a resonator 1310.4 connected to three single mode waveguides 1310.1, 1310.2, 1310.3, via tunnelling barriers 1310.5, 1310.6, 1310.7. In use, the waveguides 1310.1, 1310.2, 1310.3, are configured to act as gate, source and drain so that an acoustic wave sent through the gate propagate from the source to the drain depending on the signal applied to the gate.

Adder Circuit

Figure 14:
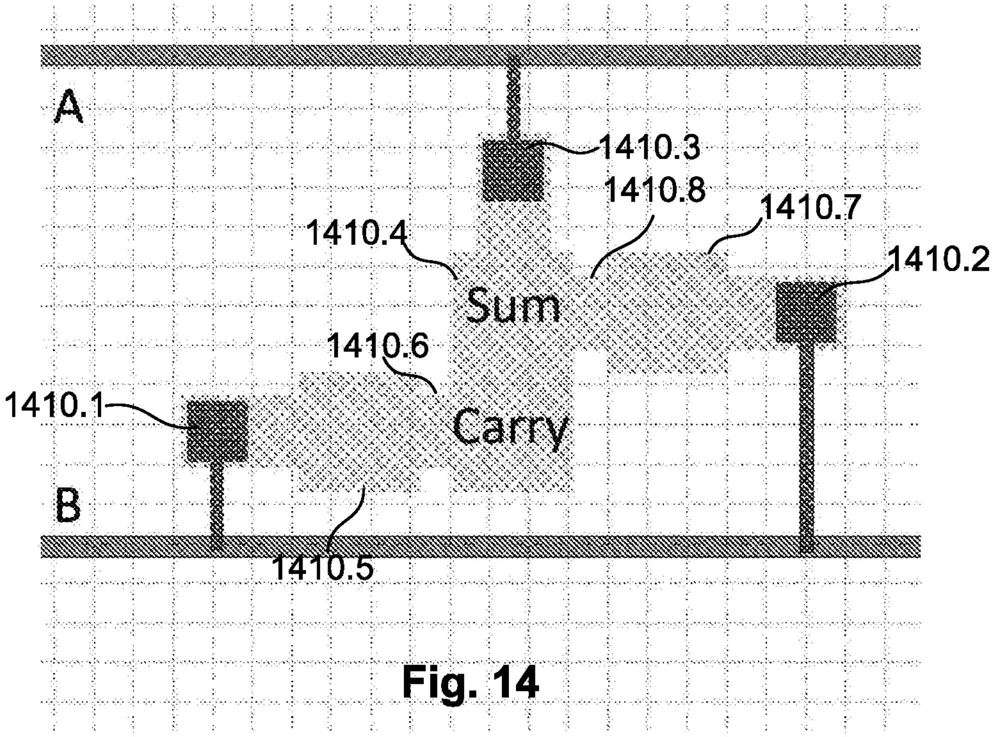
FIG. 14 is a schematic diagram of an example of a half adder phononic circuit.

A half adder circuit is shown in FIG. 14.

In this example, the circuit includes a resonator 1410.4 connected to three electrodes 1410.1, 1410.2, 1410.3, acting as inputs allowing input signals A and B to be applied to the circuit. The input 1410.3 is connected directly to the resonator 1410.4, whilst the inputs 1410.1, 1410.2 are connected via waveguides 1410.4, 1410.6 and tunnelling barriers 1410.5, 1410.7 to the resonator.

To make a half adder, 2 logic gates are needed: an AND which gives the carry and a XOR which gives the sum. The AND is straightforward since the gate must be flip to the high state only when A=1 and B=1. Therefore, A and B need to be in phase to make the AND gate. However, for the XOR, since the gate should not flip when A=1 and B=1 but only when A=1 and B=0 or A=0 and B=1. Therefore, A and B must be out of phase. The long resonator 1410.4 allows A to have two different phases and uses a second order acoustic mode so that in an upper half of the resonator A is out of phase with B, computing the sum and the lower part in phase with B to compute the carry.

Adder Circuit

Figure 15:
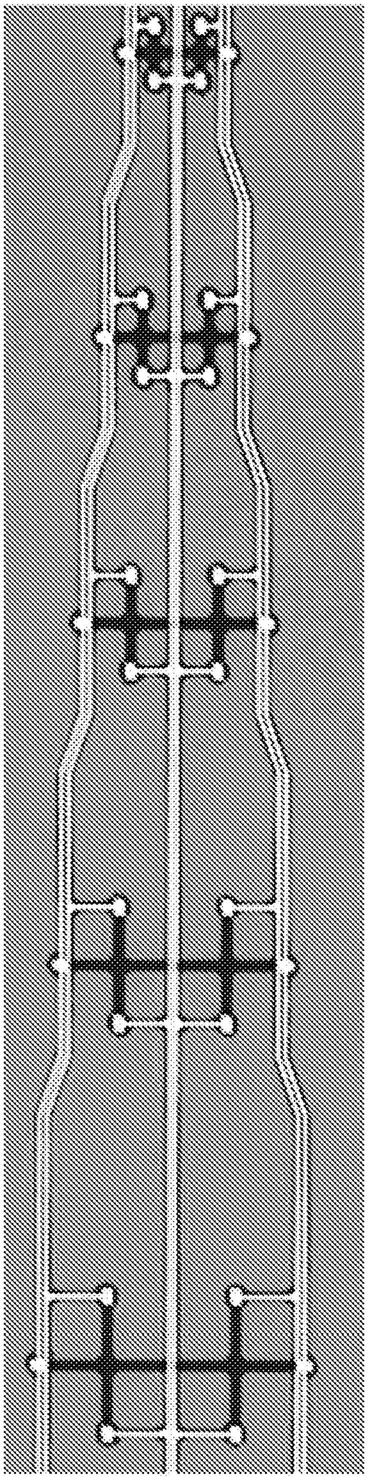
FIG. 15 is a schematic diagram of an example of a phononic circuit including cascaded gates.

It will be appreciated that circuit components, such as logic gates, can be cascaded, and an example of this is shown in FIG. 15.

Phononic Dispersion Compensation

A single mode acoustic waveguide suffers from dispersion, i.e. different frequency components within a pulse propagate along the waveguide with a different group velocity $\partial\Omega/\partial k$. This leads to pulses becoming temporally broader, and frequency-chirped, which limits signal fidelity over long distances (see illustration).

The strength of the dispersion can be quantified by the group velocity dispersion (GVD or $k_2$) given by:

$$GVD \equiv k_2 = \frac{\partial^2 k}{\partial \Omega^2}.$$

This value can be positive or negative, depending on the sign of the dispersion (i.e. whether high-frequency components propagate faster or slower than low-frequency components).

Figure 16A:
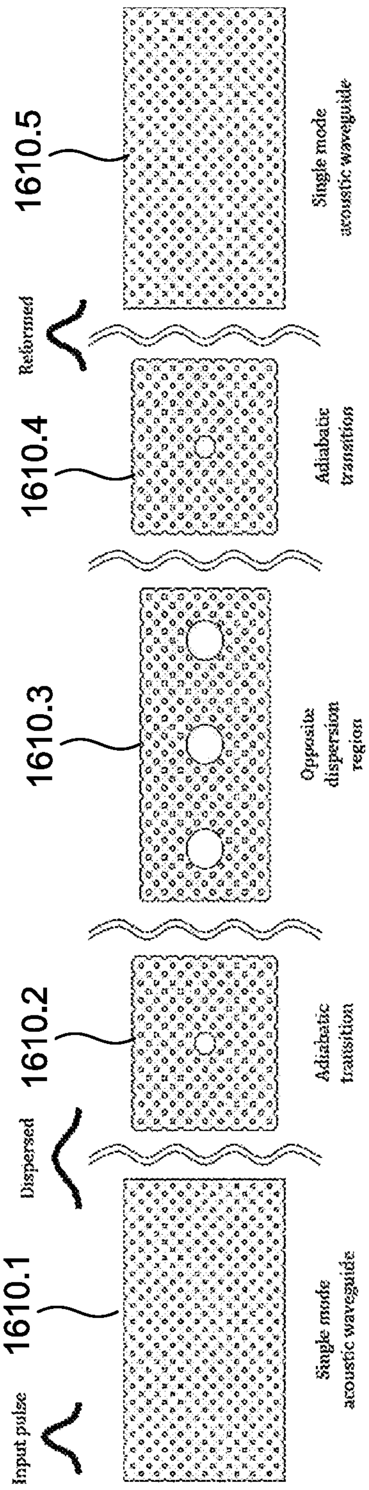
FIG. 16A is a schematic diagram of a circuit arrangement to mitigate phononic dispersion.

By concatenating two waveguide sections of opposite dispersion, it is possible to cancel the overall dispersion, and recover the unperturbed pulse shape. An example of this is shown in FIG. 16A, where a section of regular single mode acoustic waveguide segment 1610.1 is followed by a section of opposite dispersion waveguide segment 1610.3. The region of opposite dispersion is achieved by adding a periodic array of larger holes in the center of the waveguide segment 1610.3. It will be appreciated from this that the presence of differing sizes, shapes, or spacings of holes within the waveguide can be used to modify the waveguide dispersion. In this example, these larger holes create a periodically modulated acoustic impedance, and open up a bandgap for acoustic waves of a given frequency, which reverses the curvature of the dispersion curve.

Figures 16B, 16C:
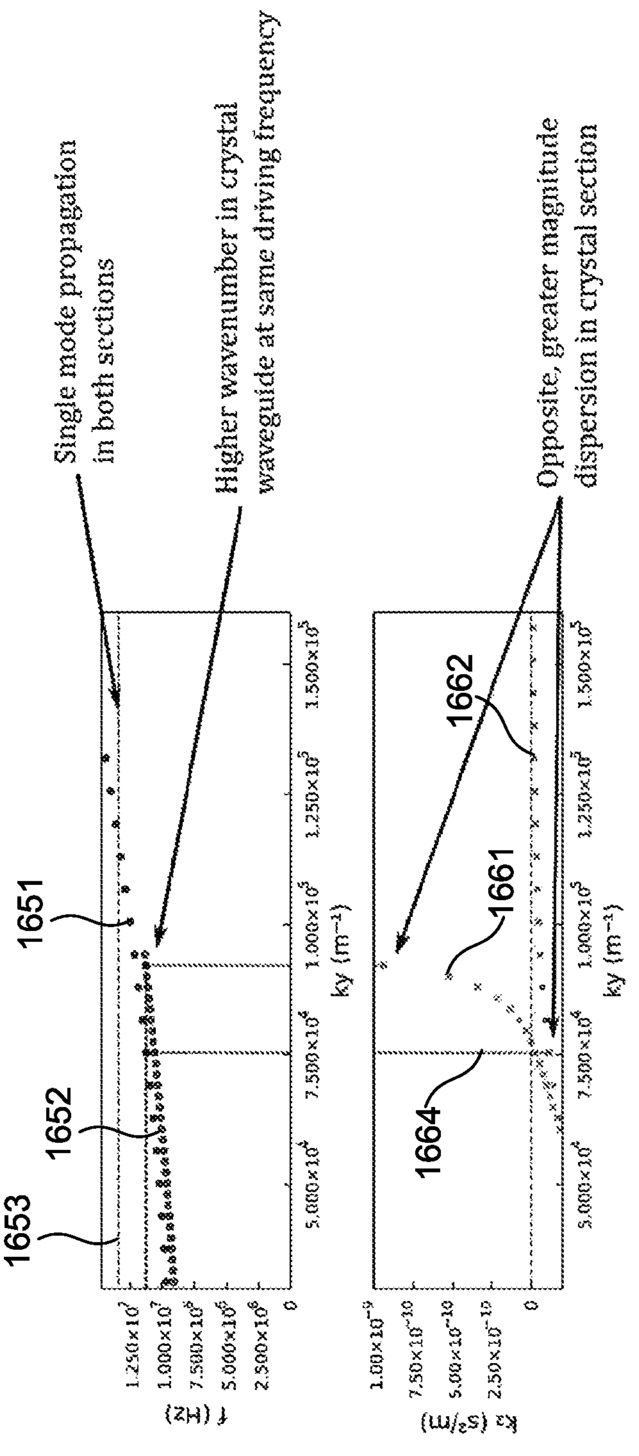
FIG. 16B is a graph illustrating acoustic dispersion relations for the waveguides of FIG. 16A.
FIG. 16C is a graph illustrating group velocity dispersion for the waveguides of FIG. 16A.

FIG. 16B shows an acoustic dispersion relation for section of meshed acoustic waveguide segments 1610.1, 1610.5 are shown by dots 1651 with a cut-off frequency $\Omega_c/2\pi \approx 10$ MHz, and opposite dispersion crystal waveguide segment 1610.3 shown by dots 1652. Dispersion curves are obtained through finite element simulation of wave propagation. Dashed line 1653 represents the lowest value of the frequency of the first higher order transverse mode in either waveguide segments 1610.1, 1610.3. Operating below this value ensures single mode operation throughout the entire section of regular acoustic waveguide+dispersion compensating region.

FIG. 16C shows the calculated group velocity dispersion $k_2$ for the same waveguide segments, as a function of acoustic wavenumber along the propagation direction $k_y=2\pi/\lambda_y$. Crosses 1661 relate to waveguide segment 1610.3, while crosses 1662 relate to waveguide segments 1610.1, 1610.5. The dashed red and blue lines show how, for a given drive frequency f=~11 MHz materialized by the black dashed line, the sign of the group velocity dispersion in waveguide segments 1610.1, 1610.5 and 1610.3 is reversed.

The larger holes in the center of the waveguide segment 1610.3 result in a frequency band which experiences an opposite sign dispersion to the initial single mode acoustic waveguide segment 1610.1. This allows the dispersion accrued in the regular single mode acoustic waveguide segment 1610.1 to be compensated by a (potentially much) shorter section of crystal waveguide.

In order to avoid any reflection at the junction between the regions of opposite dispersion, these are joined by an adiabatic transition waveguide segments 1610.2, 1610.4 over which the hole diameter (but not the hole pitch), is gradually increased over a lengthscale $L \gg \lambda$ (the acoustic wavelength). The periodicity of the hole lattice in the crystal section, as well as the lateral width of the crystal section $L_{x,3}$ are chosen such that the frequency band over which waveguide segment 1610.3 experiences opposite dispersion matches the desired operating frequency of waveguide 1.

It may be advantageous to alter the lateral width of the crystal waveguide region (i.e. $L_{x,3}<L_{x,1}$) to ensure single-mode operation throughout the entire device, as the single mode frequency range may be altered in waveguide segment 1610.3 due to the introduction of the hole lattice. The lateral width of the acoustic waveguide is then gradually reduced (increased) in the adiabatic transition waveguide segments 1610.2, 1610.4, respectively, in order to eliminate back-reflections.

This device serves the same purpose in the phononic realm as a dispersion compensating module (DCM) does in fiber-optic telecommunications.

Mechanical Nonlinearities

Setting aside intrinsic material nonlinearities, arising from the higher order corrections to the material's stiffness tensor, the main source of mechanical nonlinearities are geometric nonlinearities, arising due to surface and area changes brought about from the eigenmode deformation.

Figure 17C:
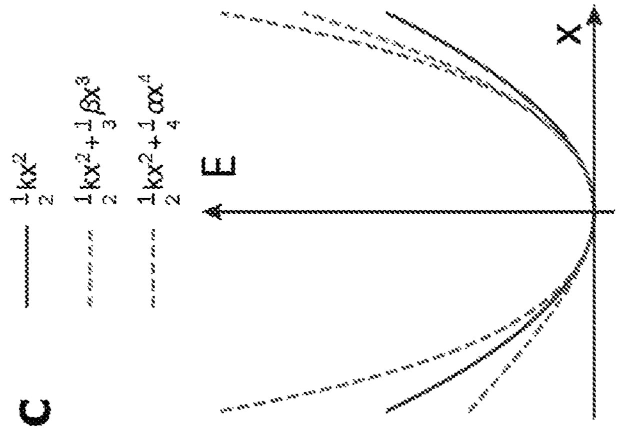
FIG. 17A is a schematic diagram of an example of out-of-plane motion of a beam resonator, showing deflection extrema, with an inset illustrating an origin of the Duffing nonlinearity.
FIG. 17B is a schematic diagram of an example of a longitudinal eigenmode of the beam; and, FIG. 17C is a graph of an example of the effect of nonlinearities on a confining potential E.
Figure 17B:
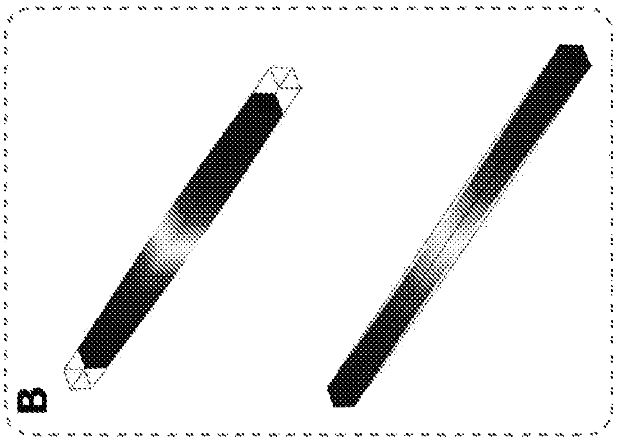
Figure 17A:
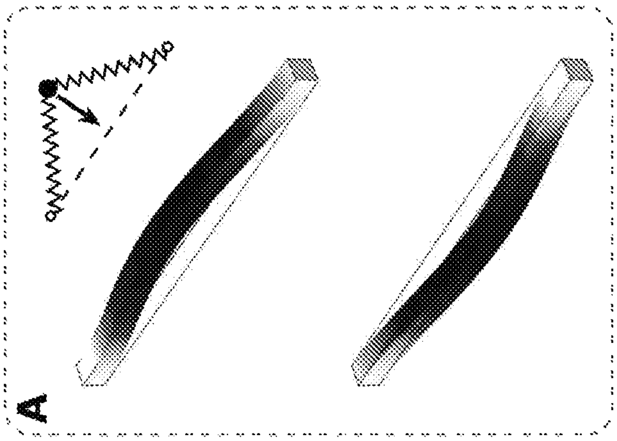

In order to illustrate the different role played by geometric nonlinearities, the flexural and longitudinal modes of a beam resonator should be considered. In FIG. 17A, the case of out-of plane motion of a doubly-clamped beam (or string) is shown. T the geometric nonlinearity leads the linear spring term k x to be supplemented by an additional nonlinear restoring force $\alpha x^3$ with $\alpha>0$, arising from the extra tensioning of the beam due to its elongation for large excursions from equilibrium. This is the classic Duffing nonlinearity, leading to an additional stiffening of the resonators confining potential $\alpha/4\ x^4$, as shown by the green dashed line in FIG. 17C, and an amplitude-dependent increase the resonator's eigenfrequency. In the case of longitudinal motion, shown in FIG. 17B, the geometric nonlinearity arises from changes in the cross-sectional area of the beam. However, in contrast to the case of out-of-plane motion, where stiffening occurred in both up and down directions, here the stiffening is followed by softening during a mechanical oscillation, as the beam's cross-section is successively enlarged and reduced. This leads to a different nonlinear restoring force of the type $\beta x^2$, leading to a correction to the trapping potential of the form $\beta/3\ x^3$, as illustrated by the dashed orange curve in FIG. 17C. The net effect of such a nonlinearity is only a modest spring softening, which can be absorbed into an effective correction to the Duffing nonlinearity. For this type of motion, the geometric nonlinearity is sufficiently weak that strong nonlinearities are typically only achieved, in the case of silicon, by reaching the material's intrinsic nonlinearities, at much higher energy.

Nanomechanical Mass Sensing

Nanomechanical resonators have been widely demonstrated as a tool to measure mass with exquisite precision, even down to a single atom. The principle of operation is that a deposited particle of mass $\Delta m$ changes the resonance frequency $\Omega$ of the mechanical resonator by increasing its mass from m to m+$\Delta$m without altering its spring constant $k=m\Omega^2$. Then the shifted frequency $Q'=\sqrt{k/(m+\Delta m}\approx\Omega(1-\Delta M/2M)$ for $\Delta m \ll m$. The frequency shift is $\Delta\Omega/\Omega=-\Delta m/2m$ motivating the use of a low mass mechanical oscillator. To resolve the shift, it is further advantageous for the oscillator to have high quality factor Q.

Frequency shifts can be resolved by feedback introduced to cause the mechanical resonator to regeneratively oscillate, greatly increasing its effective quality factor and therefore the precision with which a frequency shift can be observed. Alternatively, the mechanical resonator can be driven on resonance with an external sinusoidal drive force in a phase locked loop configuration, with the phase shift providing a precise measure of the resonance frequency.

Either way, the minimum resolvable mass change is given by the equation:

$$\delta m \approx 2m\left(\frac{E_{th}}{E}\right)^{1/2}\left(\frac{\Delta f}{Q\Omega}\right)^{1/2} \tag{S1}$$

where $E_{th}=k_BT$ is the thermal energy in the resonator, with T its temperature and $k_B$ Boltzmann's constant, E is the energy of the coherent oscillation after regenerative amplification or coherent driving, and $\Delta f$ is the measurement bandwidth in hertz (all other frequencies are angular).

Considering the case of coherent driving, using a phase locked loop for readout, the expression above can be written in terms of the amplitude of the applied force F on the resonator and its frequency $\Omega$ by recognising that $E=kx^2/2$, where x is the amplitude of mechanical oscillation, and that for resonant driving $x=FQ/m\Omega^2$.

This shows that for fixed temperature and drive force, the sensitivity improves with increasing Q and decreasing m and $\Omega$. Given that, for a given mass, out-of-plane acoustic waves generally have significantly lower frequency than compressional waves, this suggests that mass sensing should be more effective using out-of-plane motion. The ability to increase the Q of out-of-plane modes by introducing tensile stress can further be expected to provide an advantage for out-of-plane modes.

To put this on a rigorous footing, a resonator can be considered that is rectangular with dimensions (length, width, thickness)=(l, w, t). Compressional and out-of-plane modes in such a geometry have closely similar effective masses, therefore we take the masses to be equal. Assuming that the drive force, measurement bandwidth, and temperature are the same, to ensure a fair comparison. The ratio of the mass sensing performance is then:

$$\frac{\delta m_{comp}}{\delta m_{strg}} = \left(\frac{\Omega_{comp}}{\Omega_{strg}}\right)^{1/2} \times \left(\frac{\Omega_{strg}}{\Omega_{comp}}\right)^{3/2} \tag{S3}$$

Mode Frequencies

The compressional modes have frequency given by:

$$\Omega_{comp} = \frac{n\pi}{l}\sqrt{\frac{E}{\rho}} \tag{S4}$$

where n is the mode number, E is Young's modulus and $\rho$ is the density of the medium; while out-of-plane string modes have frequency given by:

$$\Omega_{strg} = \frac{n\pi}{l}\sqrt{\frac{E}{\rho}}\left(\frac{1}{12}\left(\frac{\pi n t}{l}\right)^2 + \frac{\sigma}{E}\right)^{1/2} \tag{S5}$$

where $\sigma$ is the tensile stress of the string.

The ratio of resonance frequencies is given by:

$$\frac{\Omega_{comp}}{\Omega_{strg}} = \left(\frac{1}{12}\left(\frac{\pi n t}{l}\right)^2 + \frac{\sigma}{E}\right)^{-1/2} \tag{S6}$$

Taking the highly stressed limit for out-of-plane modes, where the $\sigma$ term dominates, this can be simplified to:

$$\frac{\Omega_{comp}}{\Omega_{strg}} = \sqrt{\frac{E}{\sigma}} \tag{S7}$$

Quality Factor

Compared to a compressional mode, an out-of-plane mode under tension experiences a dilution of its dissipation, boosting its quality factor above the intrinsic material limit Qintrinsic. Indeed, the quality factor of a string under tensile stress is given by:

$$Q_{strg} = \left(\frac{1}{12}\left(\frac{\pi n t}{l}\right)^2\frac{E}{\sigma} + \frac{1}{\sqrt{3}}\left(\frac{t}{l}\right)\sqrt{\frac{E}{\sigma}}\right)^{-1} Q_{intrinsic} \tag{S8}$$

Note, here that the quality factor increases as the aspect ratio l/t increases.

To enable a simple comparison, assuming that the intrinsic quality factor is the same for compressional and out-of-plane modes, a quality factor enhancement is given by:

$$\frac{Q_{strg}}{Q_{comp}} = \left(\frac{1}{12}\left(\frac{\pi n t}{l}\right)^2\frac{E}{\sigma} + \frac{1}{\sqrt{3}}\left(\frac{t}{l}\right)\sqrt{\frac{E}{\sigma}}\right)^{-1} \tag{S9}$$

To obtain a simple dependence, taking the appropriate limit of a high aspect ratio (l/t large) so that the first term under the square-root can be neglected. This gives:

$$\left(\frac{Q_{strg}}{Q_{comp}}\right)_{large\ aspect\ ratio} = \sqrt{3}\left(\frac{l}{t}\right)\sqrt{\frac{\sigma}{E}} \tag{S10}$$

Comparison of Mass Sensing Performance

Combining the $\Omega$ and Q dependence, the ratio of resolvable masses is given by:

$$\left(\frac{\delta m_{comp}}{\delta m_{strg}}\right)_{\sigma\ large} = 3^{3/4}\left(\frac{l}{t}\right)^{3/2}\left(\frac{\sigma}{E}\right)^{1/2} \tag{S11}$$

Since $E/\sigma$~200, but (l/t)~103 to 104, in the case where the dissipation is limited by intrinsic dissipation (which is now routinely reached in many cases), the performance of a string mode with high tensile stress can be expected to exceed that of a compressional mode by four to five orders of magnitude.

DISCUSSION

Accordingly, the above described arrangements provide a scalable silicon-chip-based architecture for phononic circuitry with transverse acoustic waves. This architecture can be used to observe transverse acoustic tunnelling, and therefore can be used to build a wide variety of phononic circuit components, including, but not limited to mode-selective acoustic mirrors, demonstrate acoustic mode filters, logic gates, or the like. The architecture can be implemented by integrating tunnel barriers within single mode acoustic waveguides, in an approach analogous to evanescent coupling in optics, which has been used to build complex photonic circuits, spatial filters, add-drop filters and coupled resonators.

Fabrication can be achieved using a sub-wavelength pattern of holes to release a thin highly stressed membrane from an underlying substrate. This fabrication technique has minimal impact on acoustic wave propagation, with propagation losses as low as 0.4 dB $cm^{-1}$. The technique is also versatile and can be straightforwardly scaled to complex phononic circuits analogous to those broadly applied in the electronic and photonic domains.

Compared to previous work, the above approach using transverse acoustic waves both increases compliance and allows the material limit of the acoustic quality factor to be overcome through dissipation dilution. Together, this substantially reduces the energy required to excite high wave amplitudes, an attribute that is important for many applications. For instance, for fixed geometry and actuation force, transverse waves offer more than four orders-of-magnitude improved precision in nanomechanical mass sensing compared to longitudinal waves.

The nonlinear phononic devices required for applications such as mechanical logic and transistors, mechanical four-wave mixing and temporal pulse shaping are similarly dependent on achieving high excitation amplitudes. They further benefit from the large geometrical nonlinearity present for transverse waves. At fixed acoustic frequency, this provides access to nonlinear dynamics at energy densities two orders of magnitude lower than is the case for longitudinal waves.

Accordingly, the above approach allows transverse phononic circuits to be provided that can be used in diverse applications from distributed sensing to quantum information, nanomechanical computing, heat control in computers, radio and microwave frequency filters in mobile phones and other communications devices, nano- and micromechanical devices used in accelerometry, biomedical diagnostics, computing, telecommunications, or the like. In one example, micro- or nanoscale elements can be created to form resonators that confine and enhance acoustic waves, which in turn form the basis of microelectromechanical systems (MEMS). Furthermore, full control of acoustic waves on an integrated circuit can provide the ability to cascade a series of resonators into a high-order filter that can greatly improve the filtering capabilities of the filters in mobile phones. More sophisticated technologies to control phonons on a chip would allow applications such as large-scale arrays of coupled acoustic elements that act as an artificial nose able to identify disease markers in the breath, or computer architectures based on sound that could compete with semiconductor electronic computers in terms of information density, speed, efficiency and robustness.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A phononic circuit component including a membrane coupled to a substrate, the membrane including a region having an array of holes and a channel provided in the substrate beneath the region so that the region is released from the substrate, thereby allowing the region to propagate transverse acoustic waves, wherein the holes are spaced by a distance that is at least one of:

a) less than 10% of the wavelength of the acoustic waves;
b) less than 5% of the wavelength of the acoustic waves;
c) less than 2% of the wavelength of the acoustic waves;
d) less than 1% of the wavelength of the acoustic waves;
e) less than 20% of the width of the region;
f) less than 15% of the width of the region;
g) less than 10% of the width of the region;
h) less than 5% of the width of the region; and,
i) less than 2% of the width of the region;

wherein the region is at least one of:

a) a single mode acoustic waveguide;
b) a multi-mode acoustic waveguide;
c) a tunnel barrier;
d) an acoustic waveguide including one or more pass bands;
e) an acoustic waveguide including one or more stop bands; and,
f) a resonator;

and wherein if the region includes a tunnel barrier, and a ratio of reflection to tunnelling is based on a length of the region and an amplitude exponential decay length given by the equation:

$$\gamma = \left(\left(\frac{\pi}{L_x}\right) - \Omega^2 \frac{\rho}{\sigma}\right)^{-1/2}$$

where: Ω is an acoustic wave frequency,
y is the amplitude exponential decay length,
σ is a membrane tensile stress,
ρ is a membrane material density, and
$L_x$ is the region width.

2. A phononic circuit component of claim 1, wherein the spaced holes define repeating units, and wherein each unit has a size that is at least one of:

a) less than 15% of the wavelength of the acoustic waves;
b) less than 10% of the wavelength of the acoustic waves;
c) less than 5% of the wavelength of the acoustic waves;
d) less than 2% of the wavelength of the acoustic waves;
e) less than 30% of the width of the region;
f) less than 25% of the width of the region;
g) less than 20% of the width of the region;
h) less than 15% of the width of the region;
i) less than 10% of the width of the region; and,
j) less than 5% of the width of the region.

3. A phononic circuit component according to claim 1, wherein the region extends substantially along a crystal axis of the substrate.

4. A phononic circuit component according to claim 1, wherein the array of holes includes at least one of:

a) a grid of evenly spaced holes; and,
b) a grid of evenly spaced holes including rows and columns arranged at 45° relative to one or more region edges.

5. A phononic circuit component according to claim 1, wherein the component has a respective functionality depending at least in part on at least one of:

a) a shape of the region;
b) a width of the region;
c) a length of the region;
d) a configuration of the holes;
e) a size of the holes;
f) a shape of the holes; and,
g) a hole spacing.

6. A phononic circuit component according to claim 1, wherein the waveguide includes different sized holes to modulate an acoustic impedance.

7. A phononic circuit component according to claim 1, wherein a width of the region is selected based on a desired cut off frequency for propagation of required acoustic wave modes based on the equation:

$$\Omega_{c,n} = \sqrt{\frac{\sigma}{\rho}\left(\frac{n\pi}{L_x}\right)}$$

where: $\Omega_{c,n}$ is a cut of frequency for mode n, $\sigma$ is a membrane tensile stress, $\rho$ is a membrane material density, and $L_x$ is the region width.

8. A phononic circuit component according to claim 1, wherein the substrate is made of at least one of:

a) a crystalline material;

b) silicon;

c) gallium arsenide;

d) sapphire; and, e) lithium niobate, and wherein the membrane is made of at least one of:

a) silicon nitride;

b) aluminium nitride;

c) silicon carbide; and, d) silica.

9. A phononic circuit including a plurality of phononic circuit components according to claim 1, wherein the regions of the phononic circuit components are connected to allow propagation of acoustic waves through the phononic circuit components.

10. A phononic circuit according to claim 9, wherein the phononic circuit includes an actuator that generates acoustic waves in at least one of the one or more regions, wherein the actuator is at least one of:

a) an electrostatic transducer or actuator;

b) an interdigitated transducer or actuator;

c) a piezoelectric transducer or actuator; and, d) a magnetostrictive transducer or actuator.

11. A phononic circuit according to claim 10, wherein the actuator includes:

a) a first electrode deposited on at least one region;

b) a second electrode spaced from the first electrode; and, c) a signal generator configured to apply an electric signal between the first and second electrodes so as to electrostatically actuate acoustic waves in the at least one region.

12. A phononic circuit according to claim 11, wherein the second electrode is at least one of:

a) provided on an underside of the substrate; and, b) a ground plane electrode.

13. A phononic circuit according to claim 9, wherein the phononic circuit includes a detector that detects acoustic waves in at least one of the one or more regions, wherein the detector is at least one of:

a) an electrostatic detector; and, b) an optical detector.

14. A phononic circuit according to claim 13, wherein the detector includes:

a) a first electrode deposited on at least one region;

b) a second electrode spaced from the first electrode; and, c) a sensor configured to sense a capacitance between the first and second electrodes, the capacitance depending on the presence of acoustic waves in the at least one region.

15. A phononic circuit according to claim 9, wherein the phononic circuit includes:

a) a single mode acoustic waveguide; and, b) at least one inverse dispersion waveguide segment acting as an inverse dispersion region to mitigate phononic dispersion in the single mode acoustic waveguide, and, wherein the single mode acoustic waveguide is coupled to the at least one inverse dispersion waveguide by at least one adiabatic waveguide segment.

* * * * *